United States Patent
Lehn et al.

(10) Patent No.: US 9,059,636 B2
(45) Date of Patent: Jun. 16, 2015

(54) DC-DC CONVERTER CIRCUIT USING LLC CIRCUIT IN THE REGION OF VOLTAGE GAIN ABOVE UNITY

(76) Inventors: Peter Waldemar Lehn, Toronto (CA); Luis Zubieta, Oakville (CA); Damien Frost, Toronto (CA)

(*) Notice: Subject to any disclaimer, the term of this patent is extended or adjusted under 35 U.S.C. 154(b) by 87 days.

(21) Appl. No.: 13/469,060

(22) Filed: May 10, 2012

(65) Prior Publication Data
US 2013/0121033 A1 May 16, 2013

Related U.S. Application Data

(63) Continuation-in-part of application No. 13/384,294, filed as application No. PCT/CA2011/000185 on Feb. 18, 2011.

(60) Provisional application No. 61/305,590, filed on Feb. 18, 2010.

(51) Int. Cl.
*H02M 3/335* (2006.01)
*H02M 3/158* (2006.01)

(52) U.S. Cl.
CPC ............ *H02M 3/335* (2013.01); *Y02B 70/1433* (2013.01); *H02M 3/158* (2013.01); *H02M 3/33569* (2013.01); *Y02B 70/1425* (2013.01)

(58) Field of Classification Search
USPC ................. 323/223, 224, 226; 363/17, 21.02, 363/21.03, 136
See application file for complete search history.

(56) References Cited

U.S. PATENT DOCUMENTS

| | | | |
|---|---|---|---|
| 5,027,263 A | 6/1991 | Harada et al. | |
| 5,486,752 A | 1/1996 | Hua et al. | |
| 5,640,082 A * | 6/1997 | Lusher et al. | 323/293 |
| 5,722,057 A * | 2/1998 | Wu | 455/127.1 |
| 5,768,111 A * | 6/1998 | Zaitsu | 363/15 |

(Continued)

FOREIGN PATENT DOCUMENTS

| | | |
|---|---|---|
| CN | 1264269 A | 8/2000 |
| WO | 20090109902 | 9/2009 |
| WO | 2011100827 A1 | 8/2011 |

OTHER PUBLICATIONS

United States Patent and Trademark Office, Office Action Dated Dec. 23, 2013, issued in corresponding U.S. Appl. No. 13/384,294.

(Continued)

*Primary Examiner* — Adolf Berhane
*Assistant Examiner* — Gary Nash
(74) *Attorney, Agent, or Firm* — Norton Rose Fulbright Canada LLP

(57) ABSTRACT

The present invention provides a series of DC-DC converter circuit designs, and DC-DC converters based on such circuit design, that provide high input-to-output voltage conversion. The converters include a resonant tank and a means for interrupting the tank current to produce a near zero-loss "hold" state wherein zero current and/or zero voltage switching is provided, while providing control over the amount of power transfer. A resonant DC-DC converter for high voltage step-up ratio in accordance with the circuit design includes: (a) a low voltage DC-AC converter, (b) a resonant tank, (c) a high voltage AC-DC converter, (d) a (i) common ground on an input and an output without use of a transformer and/or (ii) a single high voltage controllable switch within the resonant tank.

20 Claims, 41 Drawing Sheets

(56) References Cited

U.S. PATENT DOCUMENTS

| | | | |
|---|---|---|---|
| 5,774,351 A * | 6/1998 | Hsieh et al. | 363/132 |
| 5,875,103 A | 2/1999 | Bhagwat et al. | |
| 6,016,257 A * | 1/2000 | Chang et al. | 363/17 |
| 6,304,461 B1 * | 10/2001 | Walker | 363/17 |
| 6,344,979 B1 * | 2/2002 | Huang et al. | 363/16 |
| 6,370,050 B1 | 4/2002 | Peng et al. | |
| 6,711,533 B1 * | 3/2004 | Aymard et al. | 703/13 |
| 6,989,997 B2 | 1/2006 | Xu et al. | |
| 7,006,362 B2 * | 2/2006 | Mizoguchi et al. | 363/16 |
| 2007/0047275 A1 * | 3/2007 | Hesterman et al. | 363/95 |
| 2007/0064457 A1 * | 3/2007 | Perreault et al. | 363/78 |
| 2007/0230228 A1 * | 10/2007 | Mao | 363/89 |
| 2007/0236967 A1 * | 10/2007 | Liu et al. | 363/21.02 |
| 2008/0089103 A1 * | 4/2008 | Hsu et al. | 363/132 |
| 2008/0247194 A1 | 10/2008 | Ying et al. | |
| 2008/0259647 A1 * | 10/2008 | Risseeuw | 363/21.1 |
| 2009/0034298 A1 * | 2/2009 | Liu et al. | 363/17 |
| 2009/0196080 A1 | 8/2009 | Zhang et al. | |

OTHER PUBLICATIONS

WIPO, International Search Report dated May 13, 2011, issued in corresponding International Patent Application No. PCT/CA2011/000185.

WIPO, International Search Report dated Feb. 8, 2013, issued in corresponding International Patent Application No. PCT/CA2012/001021.

State Intellectual Property Office, Office Action dated Jul. 16, 2014, issued in Chinese Patent Application No. 201180017205.5, together with an English translation thereof.

Canadian Intellectual Property Office, Examination Report dated Nov. 15, 2013, issued in Canadian Patent Application No. 2,768,517.

United States Patent and Trademark Office, Office Action dated Sep. 2, 2014, issued in U.S. Appl. No. 13/384,294.

Canadian Intellectual Property Office, Examination Report dated Feb. 19, 2015, issued in Canadian Patent Application No. 2,768,517.

* cited by examiner

DC-DC CONVERTER CIRCUIT USING LLC CIRCUIT IN THE REGION OF VOLTAGE GAIN ABOVE UNITY

CROSS-REFERENCE TO RELATED APPLICATIONS

This application is a Continuation-In-Part (CIP) patent application of U.S. patent application Ser. No. 13/384,294, titled "DC-DC Converter Circuit For High Input-To-Output Voltage Conversion," filed on Jan. 16, 2012, which claims the benefit of, and is based on, 35 U.S.C. 371 priority to PCT/CA2011/000185, titled "DC-DC Converter Circuit For High Input-To-Output Voltage Conversion," with the International Filing Date Feb. 18, 2011, and published as WO2011/100827 on Aug. 25, 2011, which claims the benefit of U.S. Provisional Application Ser. No. 61/305,590, titled "DC-DC Converter Circuit For High Input-To-Output Voltage Conversion," filed on Feb. 18, 2010, each of the foregoing being hereby incorporated by reference in their entireties.

FIELD

This present invention relates generally to a power converting apparatus, and more specifically to a DC-DC converter using an LLC circuit in the region of voltage gain above unity.

BACKGROUND

Direct current (DC) architectures are well known, for example for the transmission and distribution of power. DC architectures generally provide efficient (low loss) distribution of electrical power relative to alternating current (AC) architectures.

The importance of DC architectures has increased because of factors including: (1) the reliance of computing and telecommunications equipment on DC input power; (2) the reliance of variable speed AC and DC drives on DC input power; (3) the production of DC power by solar photovoltaic systems, fuel cells, and various wind turbine technologies; (4) propulsion systems in electric and hybrid vehicles, marine applications; (5) aerospace applications; (6) micro-grids and smart grids, including the above, energy storage and electric charging stations; and (7) other systems that require converters with varying input voltage and load.

The widespread use of DC architectures has also expanded the need for DC-DC power converter circuits. Moreover, there is a further need for DC-DC power converter circuits that are efficient and low cost.

Traditionally, cost reduction is achieved in part by (1) reducing the components of DC-DC power converters, and (2) increasing the switching frequency of DC-DC power converters. These cost reduction methods can be achieved by implementing transformerless DC-DC converters that switch at high frequency. High frequency operation allows the circuit designer to reduce the size, and therefore the cost, of expensive components such as transformers, inductors and capacitors. Two of the most common transformerless DC-DC converters are the buck converter 10, as shown in FIG. 1, for stepping down the voltage, and the boost converter 12, as shown in FIG. 2, for stepping up the voltage.

While both of these circuits are capable of achieving very high conversion efficiency when the input-to-output voltage ratio is near unity and the switching frequency is relatively low, their efficiency is less than optimal when the voltage ratio becomes high or the switching frequency is increased to reduce the total size of the converter. In addition, in their basic form they do not provide galvanic isolation. Loss of efficiency, along with other operational problems, are caused by circuit parasitics, including such circuit effects as diode forward voltage drop, switch and diode conduction losses, switching losses, switch capacitances, inductor winding capacitance, and lead and trace inductances. Furthermore, it is known in the prior art that boost converters in particular are susceptible to parasitic effects and high efficiency operation requires low step up ratios, e.g. 1:2 or 1:3.

B. Buti, P. Bartal, I. Nagy, "Resonant boost converter operating above its resonant frequency," EPE, Dresden, 2005, is an example of a resonant DC-DC power converter, where a resonant tank is excited at its resonant frequency to achieve high step-up/step-down conversion ratios without the use of transformers. An H-bridge based resonant DC-DC power converter was proposed by D. Jovcic (D. Jovcic, "Step-up MW DC-DC converter for MW size applications," Institute of Engineering Technology, paper IET-2009-407) and modified for enhanced modularity by A. Abbas and P. Lehn (A. Abbas, P. Lehn, "Power electronic circuits for high voltage dc to dc converters," University of Toronto, Invention disclosure RIS #10001913, 2009 Mar. 31).

The converter disclosed in B. Buti, P. Bartal, I. Nagy, "Resonant boost converter operating above its resonant frequency," EPE, Dresden, 2005, requires two perfectly, or near to perfectly, matched inductors, each only utilized half of the time, to function properly. Perfect matching is not viable in many applications. Moreover, the fact that the inductor is only utilized half of the time effectively doubles the inductive requirements of the circuit. This is undesirable as the inductor is typically the single most expensive component in the power circuit. Furthermore, the converter in B. Buti, P. Bartal, I. Nagy, "Resonant boost converter operating above its resonant frequency," EPE, Dresden, 2005, requires both a positive and negative input supply. This is often not available.

The converters disclosed in D. Jovcic, "Step-up MW DC-DC converter for MW size applications," Institute of Engineering Technology, paper IET-2009-407, and A. Abbas, P. Lehn, "Power electronic circuits for high voltage dc to dc converters," University of Toronto, Invention disclosure RIS #10001913, 2009 Mar. 31, uses four high voltage reverse blocking switching devices. For medium frequency applications (approx. 20 kHz-100 kHz) such devices are not readily available thus they need to be created out of a series combination of an insulated-gate bipolar transistor ("IGBT") and a diode, or a metal oxide semiconductor field effect transistor ("MOSFET") MOSFET and a diode. This not only further increases system cost but it also nearly doubles the device conduction losses of the converter.

Galvanic isolation and larger voltage boost and buck ratios are possible with resonant and quasi-resonant DC-DC converters. These converters use inductive and capacitive components to shape the currents and/or voltages so that the switching losses are reduced allowing higher switching frequencies without a large efficiency penalty as explained in N. Mohan, T. Undeland, W. Robbins, "Power electronics: converters, applications, and design," Wiley, 1995. Resonant and quasi-resonant DC-DC converters can be implemented with or without galvanic isolation.

A resonant converter with galvanic isolation is found in Bor-Ren Lin and Shin-Feng Wu, "ZVS Resonant Converter With Series-Connected Transformers," *Industrial Electronics, IEEE Transactions on*, vol. 58, no. 8, pp. 3547-3554, August 2011. In this work, a series resonant converter is implemented with multiple transformers connected in series. The proposed converter is designed to be used as a power factor pre-regulator in consumer electronic applications. The converter operates near the characteristic frequency defined by the resonant capacitor and resonant inductor. ZVS is achieved for all of the input switching components.

This converter developed by Bor-Ren Lin and Shin-Feng Wu uses a conventional resonant converter design approach. The resonant tank is only able to provide minimal voltage boosting, if necessary, and any voltage boosting or bucking must come entirely from the transformer turns ratio. The small amount of voltage boosting that can be provided is used when the input voltage is low. Furthermore, due to the resonant tank design, this converter would not be suitable to control the power flow between an input and an output voltage source.

Series resonant converters and parallel resonant converters are known to be very efficient for a small range of operating points. They can be implemented without galvanic isolation like the ones in FIGS. 3(a), 3(b) and 3(c) or with galvanic isolation. For applications that require a large range of input voltages and loads, they are not ideal. As shown in B. Yang, "Topology Investigation for Front End DC/DC Power Conversion for Distributed Power System", Ph.D. Dissertation, Virginia Tech, 2003, both series resonant converters and parallel resonant converters suffer from large circulating currents, and large switching currents when the input voltage is high.

In B. Yang, "Topology Investigation for Front End DC/DC Power Conversion for Distributed Power System", Ph.D. Dissertation, Virginia Tech, 2003 the author shows that some of the limitations in traditional series resonant or parallel resonant converters can be overcome by using an LLC resonant converter. The isolated LLC converter is shown in FIG. 4(b).

R. L. Lin and C. W. Lin, "Design criteria for resonant tank of LLC dc to dc resonant converter", IEEE 2010, presents a conventional design approach to obtain an LLC step down converter. The designed converter has a maximum voltage gain from the resonant tank of only 1.44, which is needed when the input voltage is at a minimum. For high input voltage the circuit is operated at, or just below, unity gain. A 9:1 transformer provides the net voltage step down needed for the application.

H. Hu, X. Fang, Q. Zhang, Z. Shen, and I. Batarseh, "Optimal design considerations for a modified LLC converter with wide input voltage range capability suitable for PV applications," ECCE 2011, is an example of a conventional LLC design methodology applied to a step up converter where the resonant circuit provides close to unity gain. All of the voltage gain is achieved through the output transformer.

In both of the works of R. L. Lin et. al. and H. Hu et. al., the conventional LLC design methodology used yields a resonant tank with very low voltage boosting properties. Furthermore, both designs require a resistive load at the output for proper functionality. These converters, and all LLC converters designed with the conventional method, are not suitable for applications where the power flow between two voltage sources is regulated.

In U.S. Pat. No. 6,344,979 an LLC converter is claimed where the converter is operated between the two characteristic frequencies of the converter, $$\omega = \sqrt{L_r C_r}$$

and $$\omega = \sqrt{(L_m + L_r) C_r}$$

to maintain output voltage regulation. However, the authors failed to address the high voltage gain region of operation and the advantages of operating there, as well as how, by choosing the right components, the designer can always ensure operation in this region. In addition, the zero current switching region of operation, designated as "LHS Operation" in this document, was not utilized nor were the benefits of operating in this region identified. The "LHS Operation" region is also only usable by a careful selection of resonant tank components, as identified in the current invention.

SUMMARY

In one aspect the present invention is a resonant DC-DC converter for high voltage step-up ratio, characterized in that the resonant DC-DC converter for high voltage step-up ratio comprises: a low voltage full-bridge or half-bridge DC-AC converter; a resonant tank; a high voltage AC-DC rectifier; and a high voltage controllable switch within the resonant tank, said high voltage controllable switch being operable to interrupt current in the resonant tank by maintaining a high voltage across the switch.

In another aspect the present invention is a resonant DC-DC converter for high voltage step-up ratio, characterized in that the resonant DC-DC converter for high voltage step-up ratio comprises: a low voltage DC-AC converter; a resonant tank; a high voltage AC-DC converter; and one or more of the following: a common ground on an input and an output without use of a transformer; and a single high voltage controllable switch within the resonant tank.

In yet another aspect the present invention is a resonant DC-DC converter for high voltage step-up ratio, characterized in that the resonant DC-DC converter for high voltage step-up ratio comprises: a low voltage DC-AC converter; a resonant tank; a high voltage AC-DC converter; and a high voltage controllable switch within the resonant tank circuit; wherein the resonant DC-DC converter for high voltage step-up radio is operable to provide one or more of the following: (i) a common ground plane for input and output; and (ii) a transformer between input and output.

In still another aspect the present invention is a resonant DC-DC converter for high voltage step-up ratio, characterized in that the resonant DC-DC converter for high voltage step-up ratio comprises: a low voltage DC-AC converter; a resonant tank; a high voltage AC-DC converter; a high voltage controllable switch within a circuit of the resonant tank; and a common ground plane for an input and output that does not require use of a transformer.

In another aspect the present invention is a resonant DC-DC converter, characterized in that the resonant DC-DC converter comprises: a transformerless DC-DC converter circuit being operable to provide high input to output voltage conversion, said transformerless DC-DC converter circuit including: a full-bridge converter on a low voltage side; a half-wave rectifier on a high voltage side; and a ground that is common to both input and output.

In yet another aspect the present invention is a DC-DC converter with a transformer, characterized in that the DC-DC converter with a transformer comprises: a resonant tank; and a high voltage switch being operable within a circuit of the DC-DC converter with a transformer to perform high voltage blocking of resonance by maintaining high voltage across the high voltage switch without reverse blocking.

In still another aspect the present invention is a DC-DC converter with a transformer, characterized in that the DC-DC converter with a transformer comprises: a resonant tank; a high voltage switch, operable with a circuit of the DC-DC converter with a transformer to perform high voltage blocking of resonance by maintaining high voltage switch across the high voltage switch without reverse blocking; a full-bridge converter on a low voltage side; and an output rectifier on a high voltage side.

In another aspect the present invention is a resonant DC-DC step-up converter with a transformer that provides bi-polar output, characterized in that the DC-DC step-up converter comprises: a high voltage winding on the transformer; two half-wave rectifiers including the following: a first half-wave rectifier operable to supply current to a positive output voltage terminal; and a second half-wave rectifier operable to draw current from a negative output voltage terminal.

In yet another aspect the present invention is a resonant DC-DC converter provided for high voltage step-up ratio that comprises: (a) a low voltage DC-AC converter, (b) a resonant tank, (c) a high voltage AC-DC converter, and (d) a single high voltage controllable switch within the resonant tank. In embodiments of the present invention the single high voltage controllable switch may be two parallel MOSFETS, or a series of MOSFETS, operating in unison.

The converter circuit may be implemented without use of a transformer. The transformer may be included if desired and/or in accordance with system requirements. For example a need for galvanic isolation could be addressed through the use of a transformer.

In another aspect the present invention is a resonant DC-DC converter comprising: a DC-DC converter circuit without a transformer that includes: (a) a full-bridge DC-AC converter on the low voltage side; (b) a half bridge AC-DC converter on the high voltage side; and (c) a ground that is common to both the input and the output, the converter circuit being operable to provide high input to output voltage conversion.

In yet another aspect of the invention, a resonant DC-DC converter circuit is provided comprising: a DC-DC converter circuit with a transformer that includes: (a) a full-bridge or half-bridge DC-AC converter on the low voltage side; (b) an AC-DC rectifier on the high voltage side; (c) a resonant tank; and (d) a high voltage switch that interrupts the main resonant tank current, the converter circuit being operable to enable the high voltage switch to perform high voltage blocking by the high voltage being maintained across the high voltage switch, with or without use of reverse blocking switch.

In another aspect the present invention is a resonant DC-DC converter for step-up ratio, characterized in that the resonant DC-DC converter for step-up ratio comprises: a full-bridge or half-bridge DC-AC converter operated with variable frequency to provide power control; a resonant tank designed and excited to provide voltage boosting over the full voltage and load range; and a half-wave or full-wave AC-DC rectifier.

In another aspect the present invention is a resonant DC-DC converter characterized in that the resonant DC-DC converter for step-up ratio comprises: a full-bridge or half-bridge DC-AC converter operated with variable frequency to provide power control; a resonant tank designed and excited to provide voltage boosting over the full voltage and load range; a transformer to provide isolation; and a half-wave or full-wave AC-DC rectifier.

In yet another aspect the present invention is a resonant DC-DC converter, characterized in that the resonant DC-DC converter for comprises: a DC-AC converter operated with variable frequency to provide power control; a resonant tank designed and excited to provide voltage boosting over the full voltage and load range; a transformer with a turn ratio selected to provide step-up or step-down operation of the converter; and an AC-DC converter.

In still another aspect the present invention is a resonant DC-DC converter for step-up ratio, characterized in that the resonant DC-DC converter for step-up ratio comprises: a DC-AC converter operated with variable frequency to provide power control; a resonant tank designed and excited to provide voltage boosting over the full voltage and load range; an AC-DC converter; and a common ground plane for an input and output that does not require use of a transformer.

In another aspect the present invention is a DC-DC converter with or without a transformer, characterized in that the DC-DC converter comprises: a DC-AC converter; a resonant tank designed and excited to provide voltage boosting over the full voltage and load range; and two half-wave rectifiers feeding a bi-polar output such that a first half-wave supplies current to a positive output voltage terminal and a second half-wave rectifier draws current from a negative output voltage terminal.

In another aspect the present invention is a DC-DC converter with or without a transformer, characterized in that the DC-DC converter comprises: a DC-AC converter; a resonant tank designed and excited to provide voltage boosting over the full voltage and load range; and an AC-DC rectifier that uses controllable or uncontrollable devices providing additional control flexibility to the system.

In yet another aspect the present invention is a DC-DC converter with or without a transformer, characterized in that the DC-DC converter comprises: a DC-AC converter; a resonant tank designed to provide voltage boosting over the full voltage and load range; and an AC-DC rectifier whereas the resonant tank is excited with a frequency that results in operation that provides zero voltage switching (ZVS) and/or zero current switching (ZCS) to the semiconductor devices forming the DC-AC and/or the AC-DC converter as required to maximize the efficiency of the circuit.

It is understood that the invention is capable of operating with other DC-AC converter configurations and AC-DC converter configuration known in previous art and/or used in different applications. It is also understood that the invention is usable in applications with different grounding requirements including floating systems, high impedance grounded systems, and solidly grounded systems and that the use or not of a transformer may be influenced by the grounding requirements.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The invention will be better understood and objects of the invention will become apparent when consideration is given to the following detailed description thereof. Such description makes reference to the annexed drawings wherein.

Figure 1:
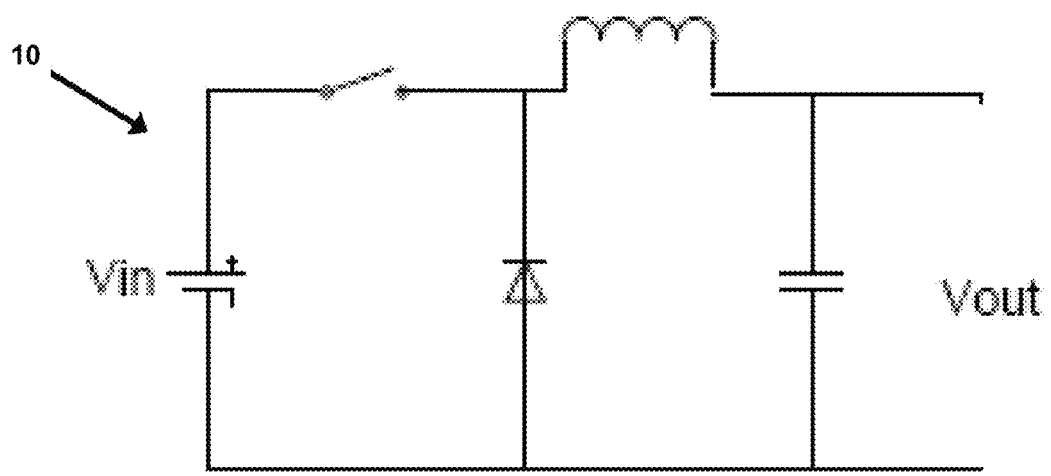
FIG. 1 is a circuit diagram illustrating a prior art buck converter.
Figure 2:
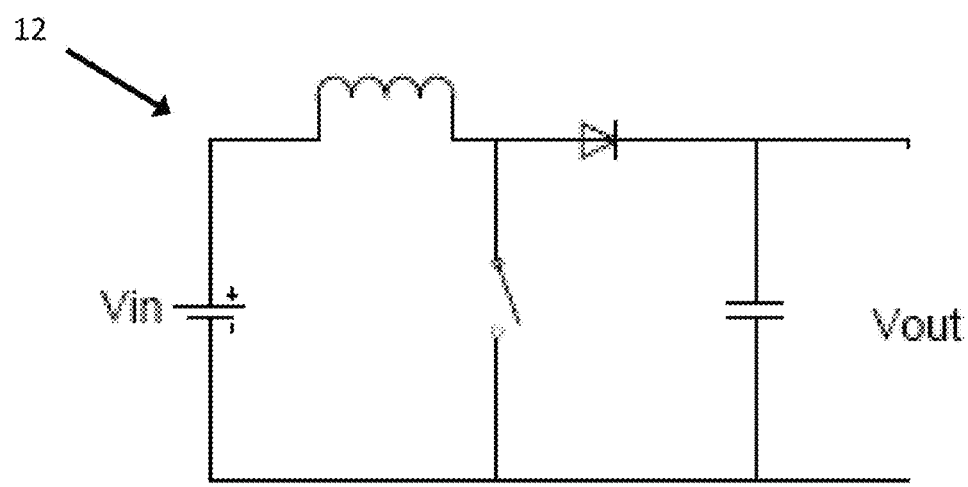
FIG. 2 is a circuit diagram illustrating a prior art boost converter.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION

The invention is a resonant converter circuit design operable to achieve high input-to-output voltage conversion. In particular the invention may include a series of converter circuit topologies that provide high input-to-output voltage conversion and achieve high efficiency operation. The converter circuit topologies may include a resonant tank and a means for interrupting the tank current to produce a near zero-loss "hold" state wherein zero current and/or zero voltage switching is provided, while providing control over the amount of power transfer. Specifically the converter circuit topologies may control energy transfer by controlling the duration of the near zero-loss "hold". This energy power transfer control may be achieved using a single high voltage controllable switch.

The present invention may avoid unnecessary circulating current during low power operation, thereby reducing losses within the tank components and the low voltage DC/AC converter, and also reducing switching losses based on the zero voltage switching of the low voltage DC/AC converter and zero current switching of the low voltage DC/AC converter. Also, zero current switching of the high voltage controllable switch within the tank may be achieved and thereby keep its own switching losses low.

As described herein, the present invention may have several embodiments that present converter circuit topologies that provide high input-to-output voltage conversion and achieve high efficiency operation. Examples of these embodiments are disclosed herein; however a skilled reader will recognize that these examples do not limit the scope of the present invention and that other embodiments of the present invention may also be possible.

For clarity, the term "low voltage" is used in this disclosure to refer to components with voltage ratings comparable to that of the input, and the term "high voltage" is used in this disclosure to refer to components with voltage rating comparable to, or above, the peak voltage level seen across the resonant tank capacitor.

In embodiments of the present invention, appropriate implementation of the near zero-loss hold state, may cause zero voltage switching or zero current switching to be achieved for all controllable switches within the circuit.

Embodiments of the present invention may provide a lower loss converter circuit for high input-to-output voltage conversion ratio converters.

The circuit design of the present invention may include a variety of elements. In one embodiment these elements may include: (1) an input DC/AC converter; (2) a resonant tank; (3) a tank interruption means (such as a switch as described herein); and (4) an output rectifier. The output rectifier may, for example, include a filter inductor that limits the rate of rise of current in the output diode. Regarding the input DC/AC, a skilled reader will recognize that a number of different types of inverters may be suitable, for example, such as a half-bridge or full-bridge type inverter. A skilled reader will further recognize that the output rectifier may include any output rectifier stage, for example, such as a half-bridge or full-bridge rectifier. In some embodiments of the present invention, a transformer may be included in the circuit, prior to the output rectification stage.

In one embodiment of the present invention, the circuit design may be a circuit that includes: (1) a full-bridge DC/AC converter; (2) a resonant tank consisting of two L components and one C component; (3) a tank interruption switch; and (4) an output rectifier stage (full-bridge or half-bridge), wherein a common ground may be provided for both the input voltage and the output voltage. The circuit may, or may not, include a transformer. In an embodiment of the present invention wherein a full-bridge output rectifier is utilized a transformer may also be required. In an embodiment of the present invention that includes a transformer, the resonant L components may be integrated into the transformer design. Possible embodiments of the present invention that include such a circuit design are shown in FIGS. 5a to 5d.

As described herein, and as a skilled reader will recognize, embodiments of the present invention may include a transformer, or may be transformerless. The choice to include a transformer in an embodiment of the present invention may be based on specifications of the circuit of the embodiment of the present invention, or other preferences or considerations. This document discloses and describes some examples of both: embodiments of the present invention that include a transformer element; and embodiments of the present invention that do not include a transformer element, and therefore are transformerless.

Figure 6A:
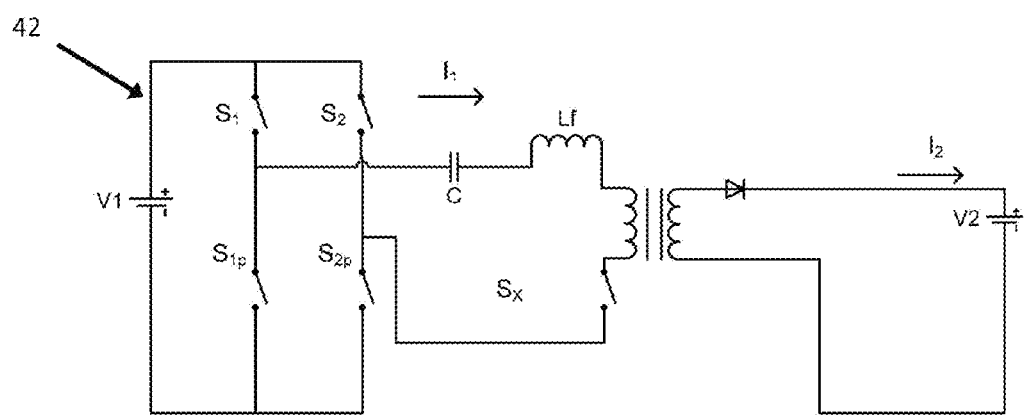
FIGS. 6(a), 6(b) and 6(c) illustrate the three representative circuits of an alternate implementation of the circuit design of the present invention that include transformer.
Figure 6B:
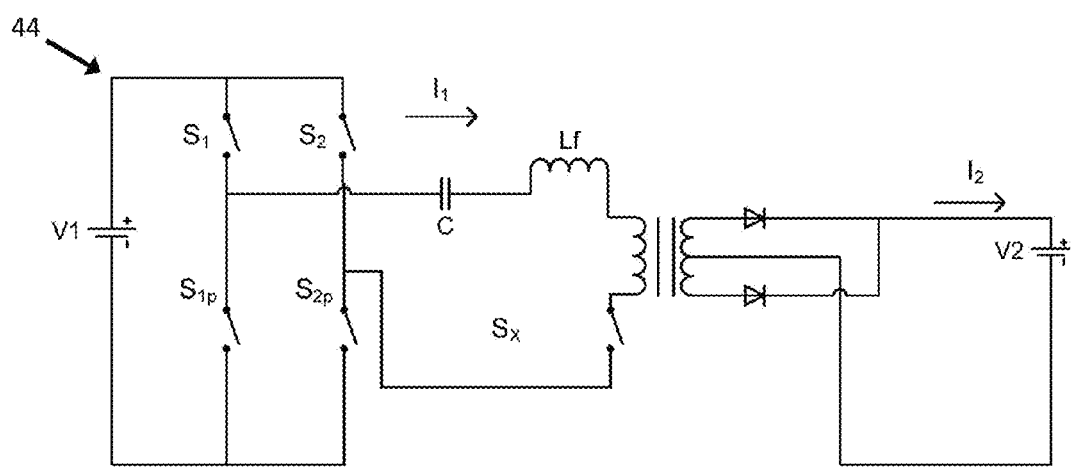
Figure 6C:
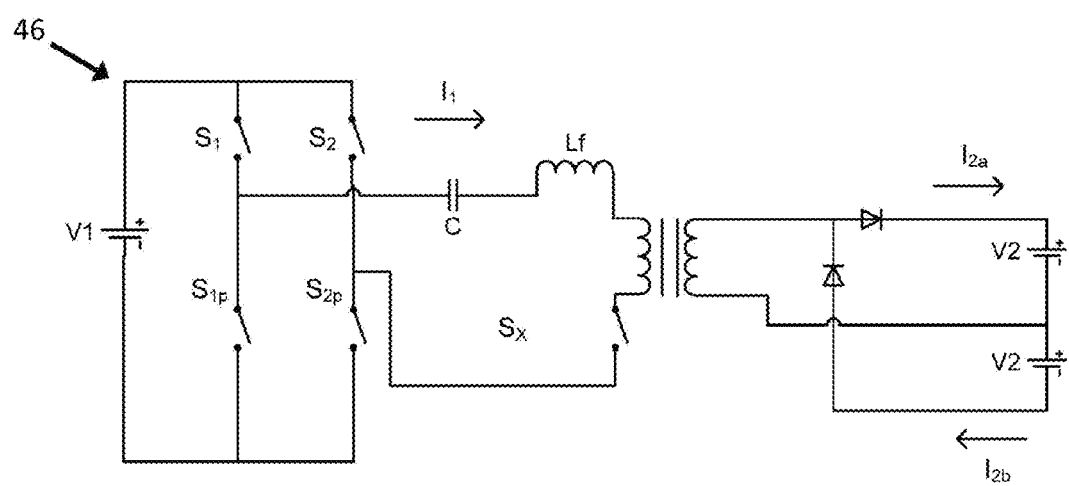

FIGS. 6(a), 6(b) and 6(c) show embodiments of the present invention that are circuits 42, 44 and 46 respectively, that include an alternate implementation, wherein additional windings were added to the main inductor's magnetic core thus decreasing the voltage stress on switch $S_x$. The addition of windings may convert the inductor L into a transformer with isolation, which provides additional circuit implementation options. The embodiment of the present invention shown in FIG. 6(c) may provide bipolar output to allow a differential output voltage of $2\times V_2$ to be achieved while maintaining a voltage to ground at level V2.

Figure 7:
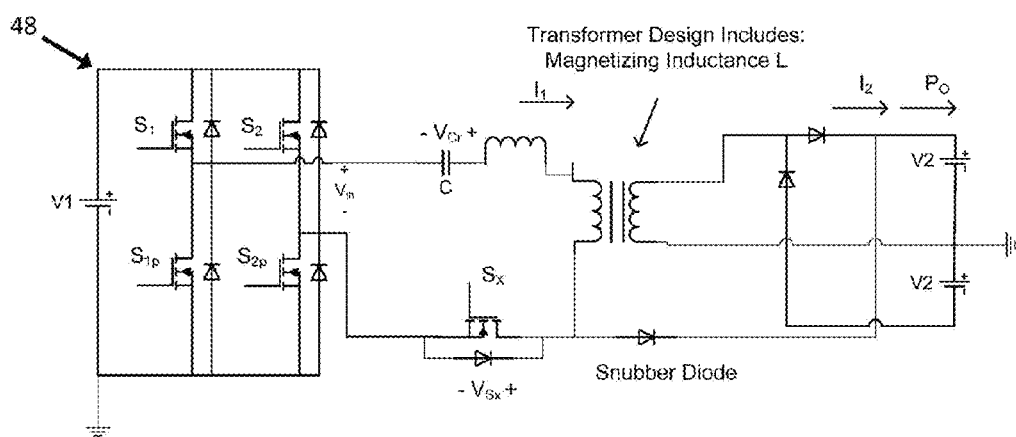
FIG. 7 is the implementation of FIG. 11d, using MOSFET switches, with the addition of a snubber diode.

As shown in FIG. 7, a circuit 48 may be one practical implementation of the circuit shown in FIG. 6(c). The transformer magnetizing branch may provide the main resonant tank inductance "L". Through appropriate transformer design, the filter inductance "$L_f$" may also be integrated into the transformer. This may be done by designing the transformer to have leakage inductance of value "$L_f$". As shown in FIG. 7, all switches may be implemented using MOSFETs. A snubber circuit may be employed to limit the transient voltage across the high voltage MOSFET at the end of the conduction period. Provided the voltage $V_2$ is lower than the voltage rating of the high voltage MOSFET, the snubber may consist of a single diode from the drain of the MOSFET to the positive output $V_2$. This may allow energy normally lost in snubber circuitry to be transferred to the output, thereby yielding a near lossless snubber. This may improve overall converter efficiency.

Figure 8:
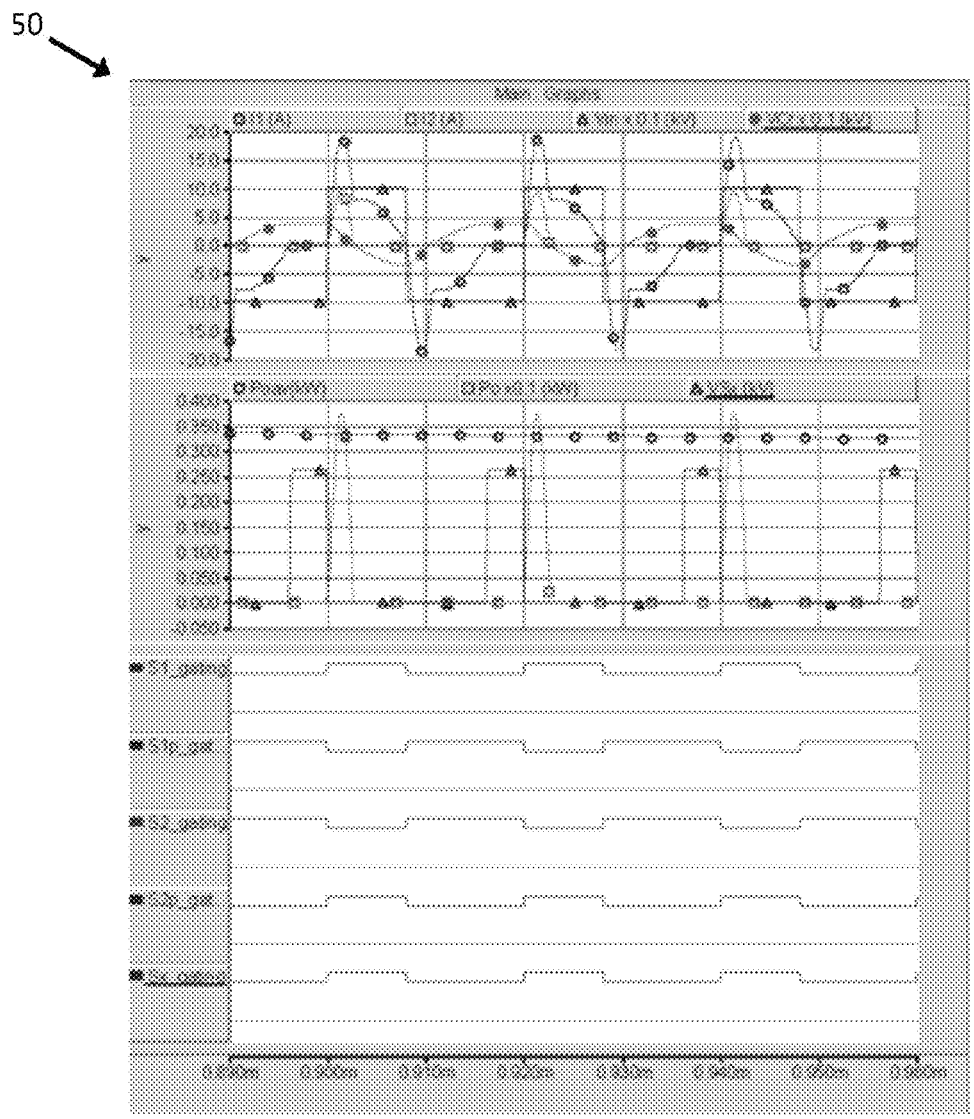
FIG. 8 illustrates the voltage and current waveforms associated in operation with the circuit of FIG. 7.

As shown in FIG. 8, embodiments of the present invention may produce particular results 50 that include gating signals for the converter of FIG. 7, together with the important voltage and current waveforms. The following is a description of a possible switching cycle method:

1. At time 0.900 ms the cycle may begin with the turning on of switches $S_1$, $S_{2p}$ and $S_x$. Thereafter energy may be transferred into the resonant tank as seen by the positive voltage $V_{in}$ and positive tank input current $I_1$.
2. When the tank current $I_1$ reaches zero switches $S_1$ and $S_{2p}$ may turn off, almost immediately after which switches $S_2$ and $S_{1p}$ may turn on. This may cause the input voltage polarity to become negative at the same time that the current becomes negative.
3. Switch $S_x$ may turn off at the same time as $S_1$ and $S_{2p}$, though the MOSFET body diode may allow conduction of the negative current. If losses in the MOSFET conduction channel are calculated to be lower than body diode conduction losses, then the MOSFET should be kept on for the duration of the negative current pulse to reduce conduction losses.
4. When the current reaches zero the switch $S_x$ must be off. This may interrupt the tank current and allow the circuit to enter a near zero loss "hold state" where the converter operation is suspended and held in a near lossless state.
5. The duration of the hold state may be varied to control the amount of average power transfer from input to output. Following the hold state another similar cycle of operation may follow.

Transfer of power from the resonant tank to the output may occur twice per period, once to the positive DC output, once to the negative DC output. Power transfer to the positive output may take place immediately after the turn on of switches S1 and S2p. Power transfer to the negative output may take place immediately after the turn on of switches $S_2$ and $S_{1p}$.

In one embodiment of the present invention, a circuit may be provided consisting of a DC-AC converter followed by a (parallel) resonant tank with single controllable high voltage switch, followed by an AC-DC converter.

Figure 3A:
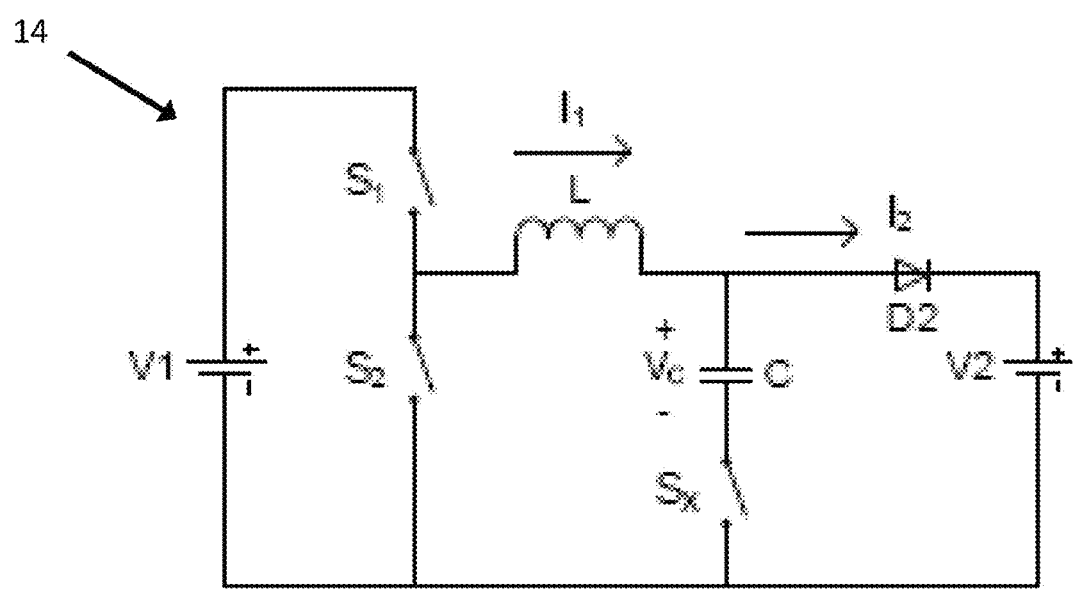
FIGS. 3(a), 3(b) and 3(c) illustrate three representative implementations of the half-bridge resonant DC-DC converter of the present invention, having a single high voltage switch.
Figure 3B:
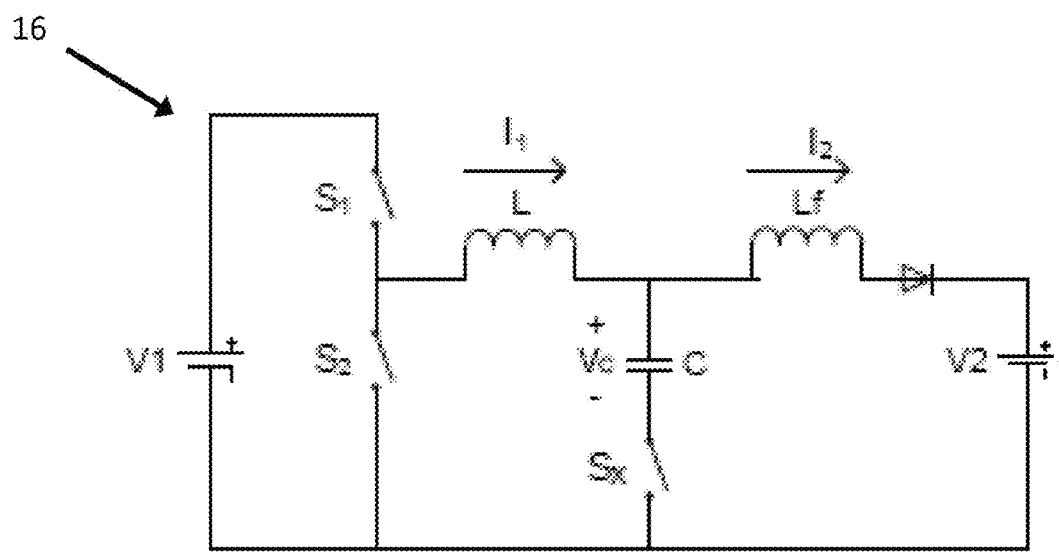
Figure 3C:
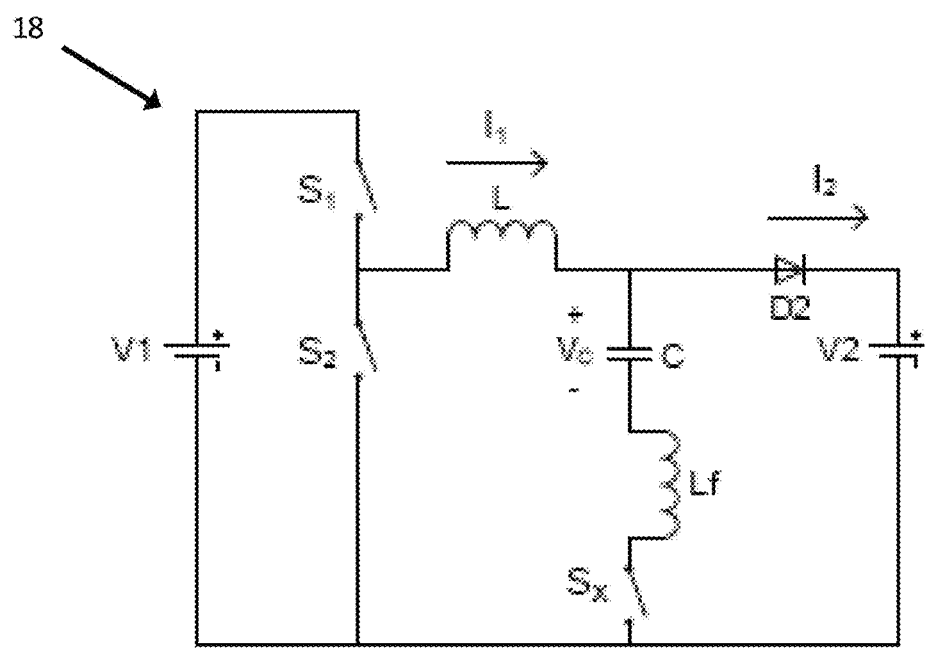

Embodiments of the present invention that includes the proposed "half-bridge floating tank" resonant DC-DC converter configuration are shown in FIGS. 3(a), 3(b) and 3(c) in three specific representative implementations. The embodiment of the present invention shown in FIG. 3(a), may be a circuit 14 that does not include an output filter inductor. FIG. 3(a) illustrates the basic circuit design concept of the present invention, and presents a half-bridge floating tank converter in accordance with the present invention. The embodiment of the present invention shown in FIG. 3(b) may be a circuit 16 that includes an output filter inductor. For most implementations of the invention, it is a practical requirement to include a filter inductor. Generally speaking, there are two locations where it is convenient to add the filter inductor. The first is illustrated in FIG. 3(b). The second is shown in FIG. 3(c), which shows an embodiment of the present invention that may be a circuit 18 that includes a filter inductor integrated in the tank.

Figure 4A:
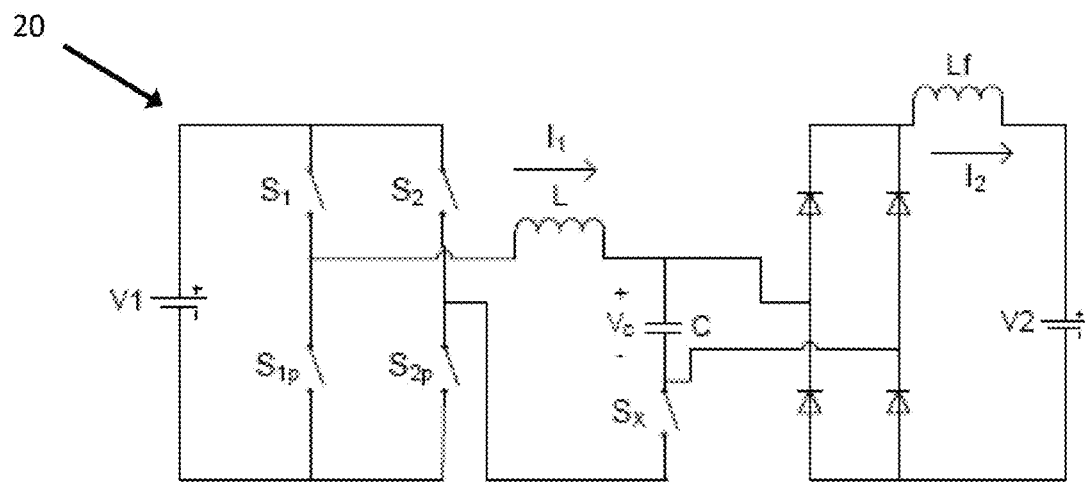
FIGS. 4(a) and 4(b) illustrate an implementation of a full-bridge resonant DC-DC converter of the present invention, with a single high voltage with and without galvanic isolation.

As shown in FIG. 4(a), in one embodiment of the present invention the circuit 20 may be a "full-bridge floating tank" configuration of the circuit design illustrated in FIGS. 3(a), 3(b), and 3(c). FIG. 4(a) may be extension of the converter illustrated in FIGS. 3(a), 3(b) and 3(c). A skilled reader will recognize that the circuit 20 shown in FIG. 4(a), relative to the circuits 22, 24, and 26 shown in FIGS. 5(a), 5(b), 5(c), and 5(d) respectively, for example, may lack a common ground on the input and the output and therefore may be undesirable for many transformerless applications. In embodiments of the present invention an isolation transformer may be added between the capacitor and the diode rectifier, to allow grounding of both the input and output voltage sources.

Embodiments of the present invention, as shown in FIGS. 5(a), 5(b), 5(c) and 5(d), may represent variants of the full-bridge resonant DC-DC converter of the present invention, and may include a single high voltage switch, and a common ground for the input and the output. More specifically: the embodiment of the present invention shown in FIG. 5(a), may be a circuit 22 wherein the inductor current may be switched by the single high voltage switch ($S_x$); the embodiment of the present invention shown in FIG. 5(b), may be a circuit 24 wherein the capacitor current may be switched by the single high voltage switch ($S_x$); the embodiment of the present invention shown in FIG. 5(c), may be a circuit 26 that is similar to the circuit 22 shown in FIG. 5(a), and the circuit 26 shown in FIG. 5(c) may include an inductor current that may be switched by $S_x$ and the filter inductor may be integrated into the tank; and the embodiment of the present invention shown in FIG. 5(d), may be similar a circuit 28 that is similar to the circuit 24 shown in FIG. 5(b), and the circuit 28 shown in FIG. 5(d) may include a capacitor current that may be switched by $S_x$ and the filter inductor may be integrated into the tank.

It should be understood that the DC-DC converter of the present invention as shown in FIGS. 5(a), 5(b), 5(c) and 5(d), relative to prior art full-bridge extensions of half-bridge circuits, may display a significant degree of asymmetry. In particular the asymmetry may be displayed in that the grounding is asymmetric, the input switch configuration is asymmetric, and the output stage is asymmetric.

A skilled reader will recognize that other variants and embodiment of the present invention are possible. For example an embodiment of the present invention may use emerging reverse block IGBT devices, in which case $S_x$ may be eliminated, but $S_1$ and $S_2$ may each need to consist of a high voltage reverse blocking IGBT. Such an embodiment of the present invention may yield precisely the same voltage and current waveforms within the tank and output circuitry. Numerous other variations are possible.

In an embodiment of the present invention, the circuit design may be such that the high voltage switch needs not be reverse blocking, and thus MOSFETs or IGBTs may be used instead of, for example, thrysitors (which limit switching frequencies to excessively low values), or MOSFET-series-diode/IGBT-series-diode combinations.

Also, in embodiments of the present invention, the circuit designs may use an electrically floating tank, as further explained below.

Certain aspects of the invention are explained in greater detail below, however these details should not be read as limiting the scope of the invention in anyway, but as examples of embodiments of the present invention.

The Half-Bridge Floating Tank Converter

Figure 9:
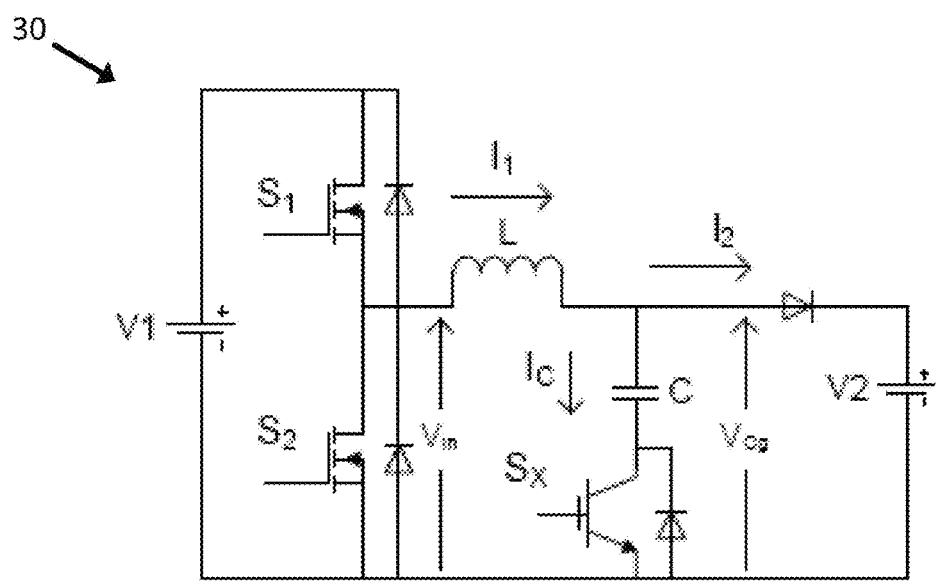
FIG. 9 is a specific implementation of the half-bride resonant DC-DC converter of FIG. 3(a) using a combination of MOSFET and IGBT switches.

The half-bridge floating tank converter may be included in embodiments of the present invention. In such an embodiment of the present invention, the switching process may vary slightly based on the type of switches used and the location/orientation of the high voltage switch ($S_x$) within the tank circuit. A description of a possible switching process to be used in an embodiment of the present invention is provided herein with reference to a topology 30 wherein $S_1$ and $S_2$ are implemented using MOSFETS and $S_x$ is implemented using a high voltage IGBT, as shown in FIG. 9.

Figure 10:
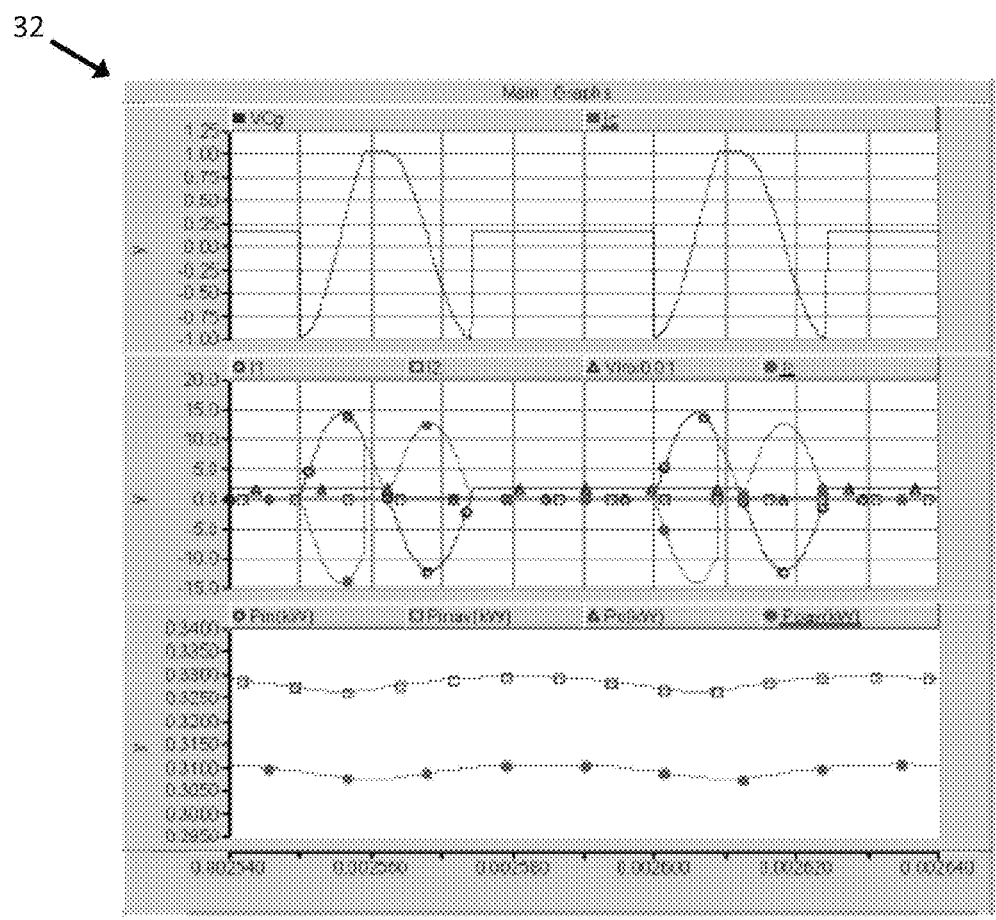
FIG. 10 illustrates the voltage and current waveforms associated in operation with the circuit of FIG. 9.
Figure 11:
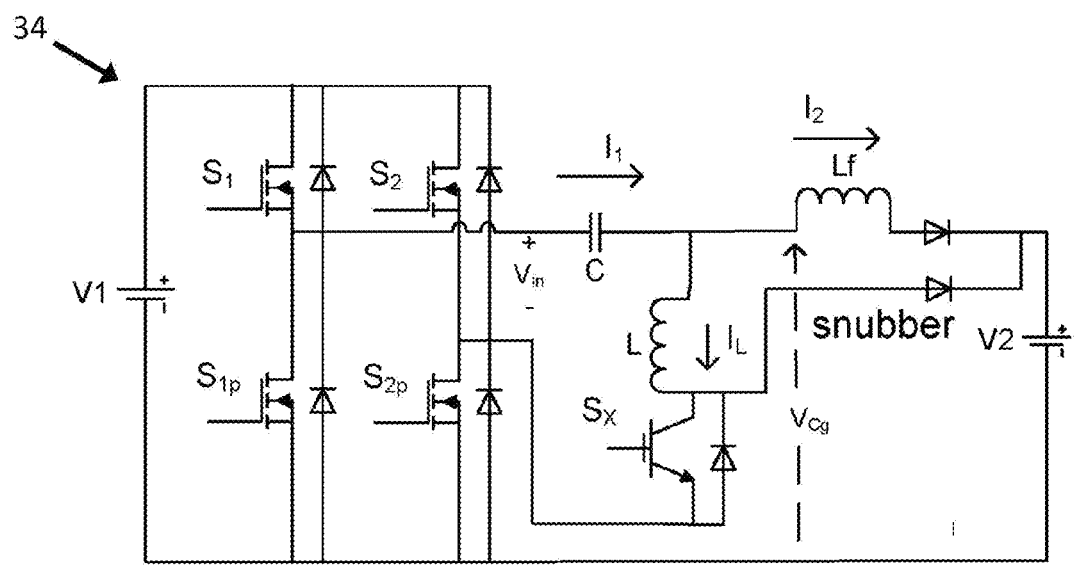
FIG. 11 is a specific implementation of the full-bridge resonant DC-DC converter of FIG. 5(a) using a combination of MOSFET and IGBT switches, with the addition of a snubber diode.

In one embodiment of the present invention, as shown in FIG. 10, waveform results 32 of use of the embodiment may show particular voltage and current waveforms associated with a half-bridge floating tank converter. For example, the converter may operate in a mode where the inductor current is not continuously oscillating but is interrupted, once each period, by the single high voltage switch, $S_x$.

An example of the operation of the circuit may be as follows:

1. $S_1$ and $S_x$ may fire to begin one cycle of LC resonant oscillation. For the given orientation of the IGBT ($S_x$), the initial condition on the capacitor voltage may be approximately $-V_2$.
2. Current I1 may be positive and input voltage $V_{in}$ may be positive for half a cycle, transferring energy into the circuit.
3. Once $V_{cg}$ reaches $V_2$, the output diode conductors and I1 may be transferred to the output, accomplishing output power transfer (the rapid rate of rise of the output current may be reduced through introduction of an additional current-rate-of-change limiting inductor placed either in series with the output diode or the tank capacitor).
4. At zero crossing of the input current $S_1$ may be turned off and $S_2$ may be turned on. The output diode may turn off at this time and the IGBT reverse conducting diode may turn on at this time. This allows the tank oscillation to continue, thereby recharging the capacitor to $-V_2$, in preparation for the next cycle.
5. When the current I1 attempts again to go positive, the IGBT may be in an "off" state, thus interrupting the tank oscillation at a current zero crossing.
6. The circuit may then in a 'hold state' until a new pulse of energy is required.

The Full-Bridge Floating Tank Converter with Common Ground

Embodiment of the present invention may include a full-bridge floating tank converter with common ground. In such embodiments of the present invention the switching process may vary slightly based on the type of switches used and the location/orientation of the high voltage switch ($S_x$) within the tank circuit. One embodiment of the present invention include a full-bridge floating tank converter with common ground may include a topology 34 where the four switches $S_1$, $S_{1p}$, $S_2$ and $S_{2p}$ are implemented using MOSFETS and $S_x$ is implemented using a high voltage IGBT, as shown in FIG. 8. In an embodiment of the present invention that includes a full-bridge floating tank converter with common ground, a snubber circuit may be employed to limit the transient voltage across the high voltage MOSFET at the end of the conduction period. The snubber may consist of a single diode from the collector of the IGBT to the output. This may allow energy normally lost in snubber circuitry to be transferred to the output, thereby yielding a near lossless snubber. Such embodiments of the present invention may improve overall converter efficiency.

Figure 12:
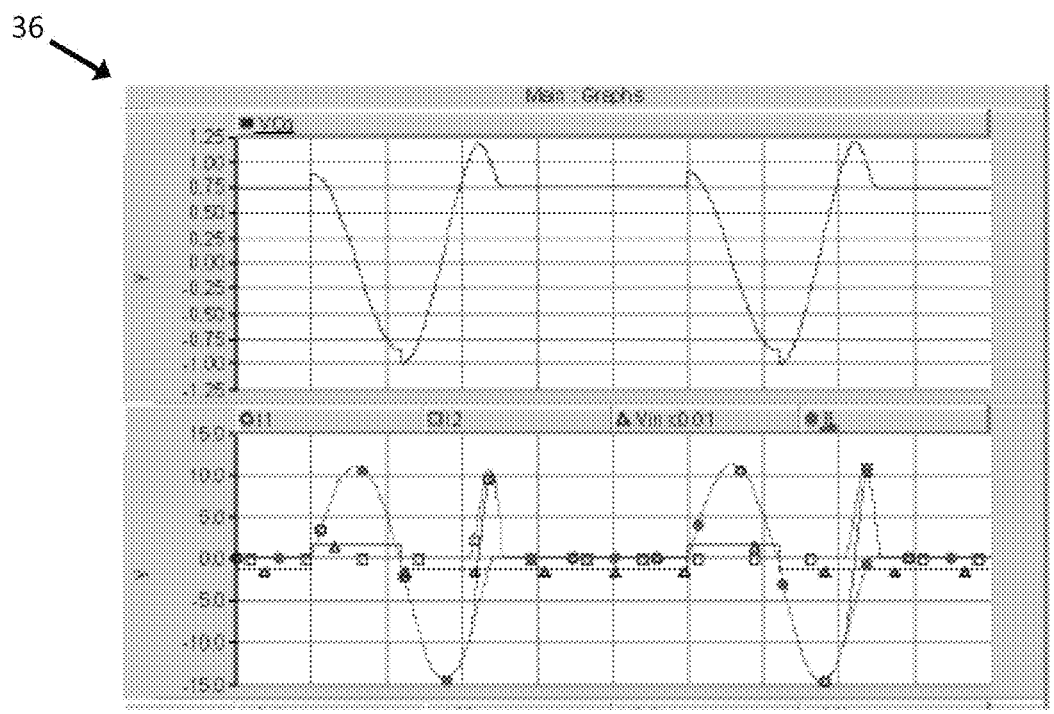
FIG. 12 illustrates the voltage and current waveforms associated in operation with the circuit of FIG. 11.

In one embodiment of the present invention, as shown in FIG. 12, waveform results 36 of use of the embodiment may show particular voltage and current waveforms associated with this a full-bridge floating tank converter with common ground. The converter may operate in a mode where the inductor current is not continuously oscillating but is interrupted, once each period, by the single high voltage switch, S.

An example of the operation of the circuit may be as follows:

1. For the given orientation of the IGBT ($S_x$), $S_1$, $S_{2p}$ and $S_x$ may fire to begin one cycle of LC resonant oscillation.

2. Current $I_1$ may be positive and input voltage $V_{in}$ may be positive for half a cycle, transferring energy into the circuit.
3. When $I_1$ crosses zero $S_1$, $S_{2p}$ may turn off and $S_2$ and $S_{1p}$ may turn on. Sometime during negative $I_1$ the switch $S_x$ may be turned off losslessly since the current is flowing in the anti-parallel diode.
4. When $V_{cg}$ reaches $V_2$ power may begin being transferred to the output. This may continue until the current $I_2$ decays to zero.
5. Capacitor voltage may then be in a 'hold state' until a new pulse of energy is required.

The Full-Bridge Converter with Common Ground and Silicon Carbide Device

Embodiment of the present invention may include a full-bridge floating tank converter with common ground that is operable to transfer energy during both positive and negative half cycles of the tank current, without use of a transformer, while maintaining a common ground on input and output, as required for many applications. The purpose of Sx in this circuit may be to achieve zero current/zero voltage switching while still offering control over the amount of power transfer. Thus near zero switching loss may be achieved while simultaneously maintaining control over the amount of power transfer.

As silicon carbide switching devices, or other devices with low reverse recovery loss, become more cost effective it may become worthwhile to eliminate $S_x$. Nonetheless, a common ground arrangement capable of transferring energy during both positive and negative half cycles of the tank current may still be desired. The circuit topologies 38 and 40 of FIGS. 13(a) and 13(b) accomplish this. These topologies may be related to the circuit designs shown in FIGS. 5a and 5c. As silicon carbide devices may offer greatly reduced switching losses (esp. the elimination of diode reverse recovery current), maintaining zero current/zero voltage switching may be sacrificed without negatively impacting efficiency. Power transfer may then be achieved via frequency control, as is common in other resonant converters, see: R. Erickson, D. Maksimovic, "Fundamentals of Power Electronics," Kluwer Academic Publishers, 2001.

The full-bridge converter with common ground may offers important benefits compared to the conventional resonant converters as outlined in R. Erickson, D. Maksimovic, "Fundamentals of Power Electronics," Kluwer Academic Publishers, 2001. Specifically the topology of an embodiment of the present invention that includes a full-bridge converter with common ground may offer common ground on input and output along with a high step-up ratio and may offer power transfer into the tank during both positive and negative half cycles of the tank current.

As examples of embodiments of the present invention and the benefits that these offer over the prior art, benefits of particular features of two principal circuit arrangements (a half-bridge floating tank converter, and a full-bridge floating tank converter with common ground) over the prior art are described below. A skilled reader will recognize that the features and benefits discussed below are merely provided as examples, and other embodiments and benefits are also possible.

Benefits of the Half-Bridge Floating Tank Converter:

Embodiments of the present invention that include a half-bridge floating tank converter may offer particular benefits over the prior art. Some of these benefits include the following:

1. In comparison to the circuit of A. Abbas, P. Lehn, "Power electronic circuits for high voltage DC to DC converters," University of Toronto, Invention disclosure RIS #10001913, 2009 Mar. 31, or that of D. Jovcic, "Step-up MW DC-DC converter for MW size applications," Institute of Engineering Technology, paper IET-2009-407, the half-bridge circuits of the present invention may only use one high voltage device, labelled: $S_x$. Furthermore $S_x$ may not need to be a reverse blocking device.
2. A single high voltage switch may be operable in embodiments of the present invention to interrupt the resonant operation of the converter, thereby controlling energy transfer.
3. $S_1$ and $S_2$ may be implemented in embodiments of the present invention using only low voltage components, reducing losses.
4. In comparison to the invention of B. Buti, P. Bartal, I. Nagy, "Resonant boost converter operating above its resonant frequency," EPE, Dresden, 2005, embodiments of the present invention may only require a single source and single tank inductor.
5. Embodiments of the present invention may provide zero current/zero voltage switching of the input AC-DC converter.

Benefits of the Full-Bridge Floating Tank Converter with Common Ground

Embodiments of the present invention that include a full-bridge floating tank converter with common ground may offer particular benefits over the prior art. Some of these benefits include the following:

1. In comparison to the circuit of A. Abbas, P. Lehn, "Power electronic circuits for high voltage DC to DC converters," University of Toronto, Invention disclosure RIS #10001913, 2009 Mar. 31, or that of D. Jovcic, "Step-up MW DC-DC converter for MW size applications," Institute of Engineering Technology, paper IET-2009-407, the circuit of embodiments of the present invention may operate using only one high voltage device, labeled $S_x$, as shown in FIGS. 3(a), 3(b), 3(c), and 3(d). Furthermore $S_x$ may not need to be a reverse blocking device.
2. In comparison to the circuit of P. Lehn, "A low switch-count resonant dc/d converter circuit for high input-to-output voltage conversion ratios," University of Toronto, Invention disclosure RIS 10001968, 2009 Aug. 13, or the half-bridge circuit of the present invention, the full-bridge DC-DC converter of embodiments of the present invention may provide roughly double power transfer since energy may be transferred from the source into the tank during both positive and negative half cycles of the tank current.
3. Embodiments of the present invention may provide zero current/zero voltage switching of the input AC-DC converter.
4. In embodiments of the present invention common ground may be provided between the input voltage source and output voltage source.
5. In embodiments of the present invention a single high voltage switch may be operable to interrupt the resonant operation of the converter, thereby controlling energy transfer.

Figure 4B:
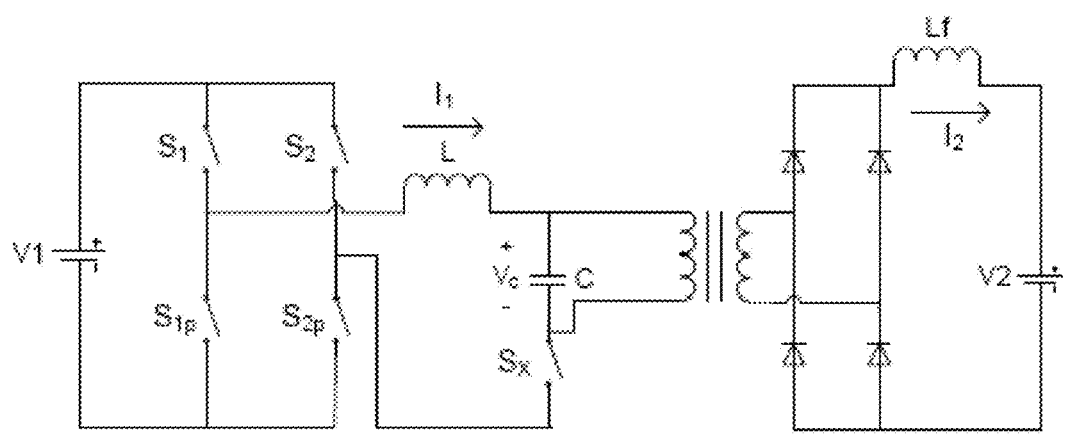
Figure 5A:
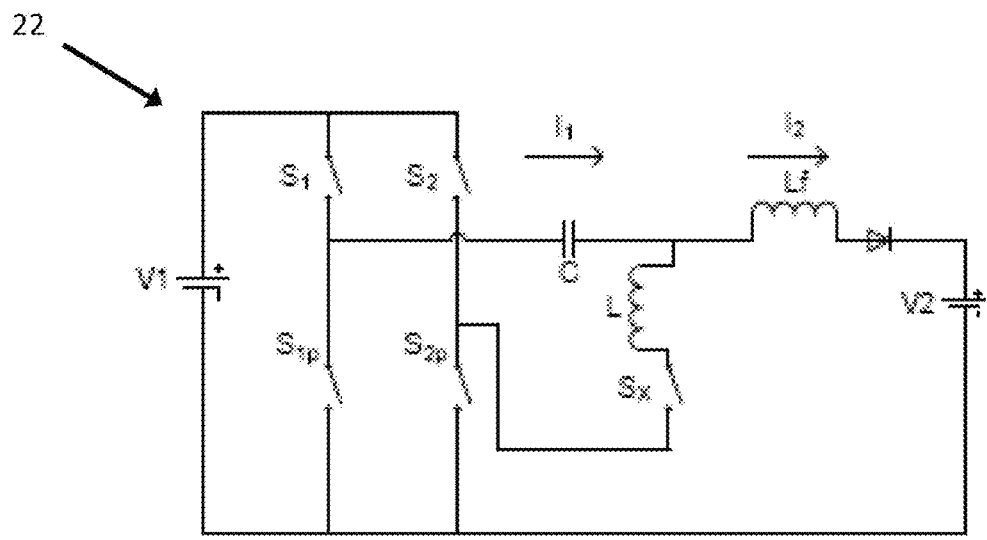
FIGS. 5(a), 5(b), 5(c) and 5(d) illustrate four representative implementations of the full-bridge resonant DC-DC converter of the present invention, having a single high voltage switch and a common ground on the input and the output.
Figure 5B:
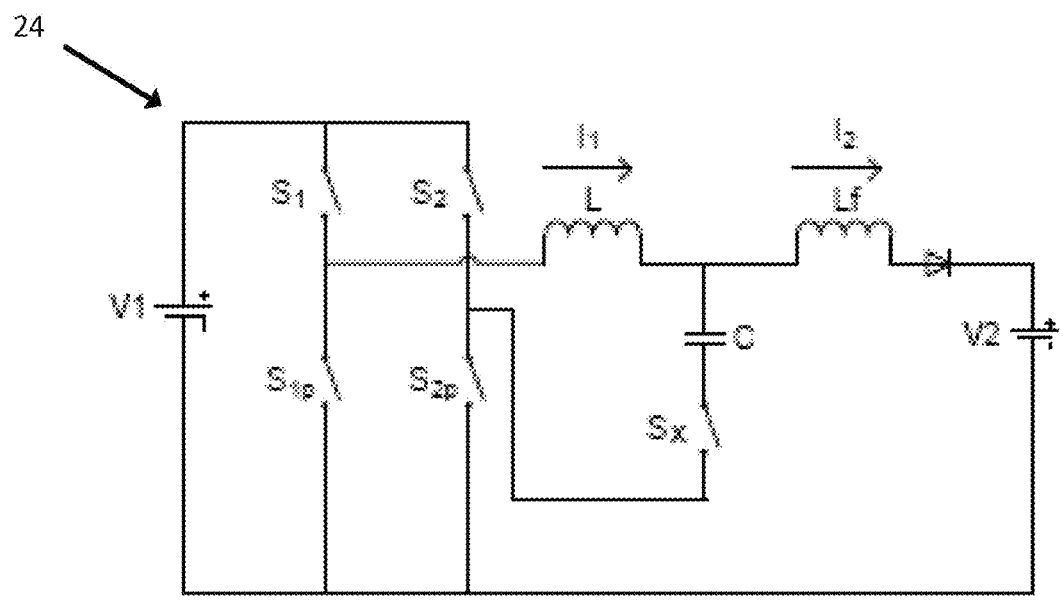
Figure 5C:
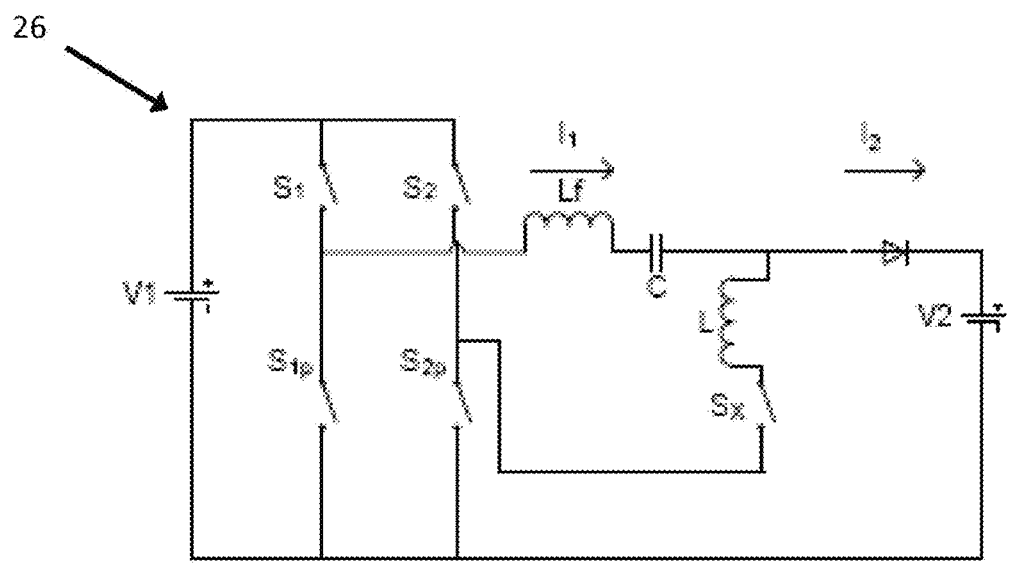
Figure 5D:
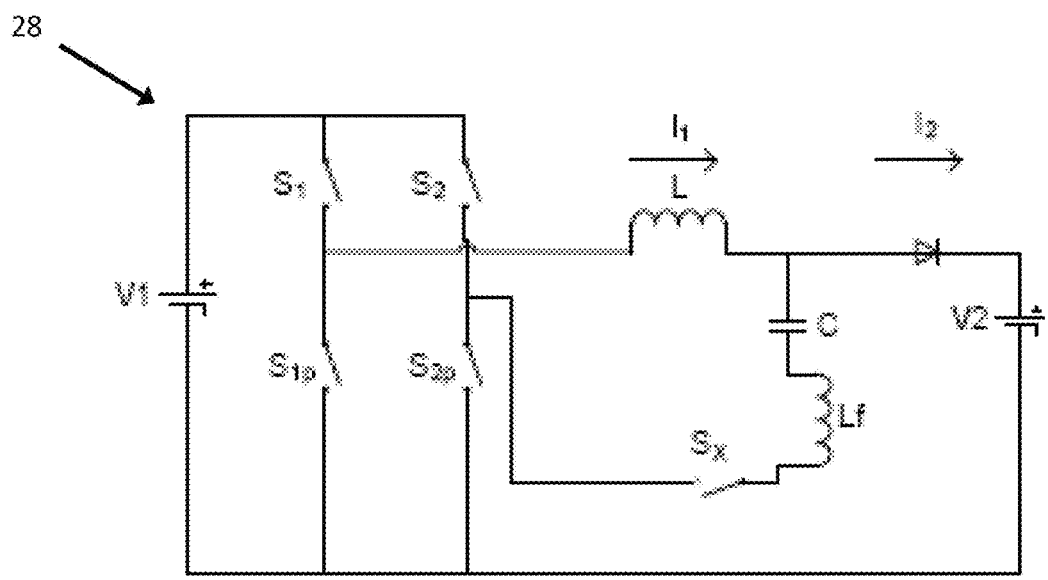

A skilled reader will recognize that numerous implementations of the technology of the present invention are possible. The circuit designs of embodiments of the present invention may present a modular structure and therefore components may be added or removed, while providing the functionality of the design, as described above. For example, particular embodiments of the DC-DC converter of the present invention may be transformerless. In other embodiments of the present invention it may be desirable to include a transformer in the circuit, such as the circuit shown in FIG. 4(b). For example, a transformer could be included between either the resonant tank inductor or resonant tank capacitor and the diode rectifier in the circuit shown in FIG. 4(b). Also, while use of $S_x$ is described for some embodiments of the present invention, this component may be eliminated by, for example, using emerging reverse block IGBT devices, where $S_1$ and $S_2$ would each need to consist of a high voltage reverse blocking IGBT.

Variants

A skilled reader will recognize that in embodiments of the present invention specific aspects of the topologies described and shown herein may be modified, without departing from the essence, essential elements and essential functions of the topologies. For example, in the circuit design 42 shown in FIG. 6(b), if Lf and C are in series with no midpoint, it may be possible to swap Lf and C. Similarly, when used with a transformer, any number of known output winding and rectifier configurations may be applied to achieve the same objective.

Figure 13A:
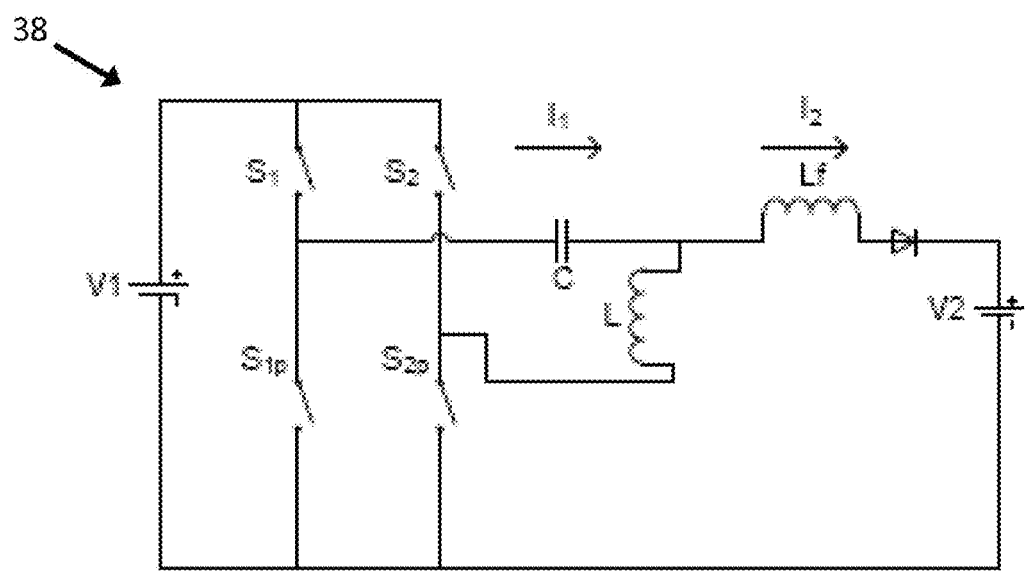
FIGS. 13(a) and 13(b) are circuit diagrams illustrating alternate implementations of the full-bridge resonant DC-DC converter of the present invention, with a common ground for the input and the output, but without a high voltage switch.
Figure 13B:
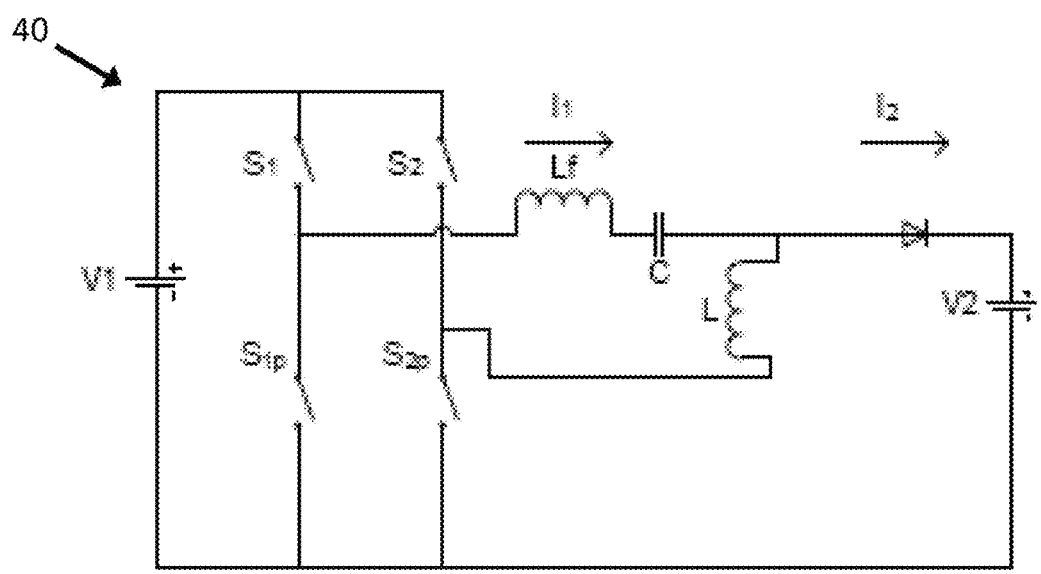

In one embodiment of the present invention the switching elements, for example as shown in the FIG. 13(b) may employ silicon carbide devices. Switching may be carried out to provide a square wave voltage switching between +V1 and −V1 to the tank circuit. The switching carried out to provide a square wave voltage may be switching between +V1 and 0 (or between 0 and −V1) to the tank circuit. Tank input voltage switching may occur between +V1 and −V1 when operating near rated power and between +V1 and 0 (or between 0 and −V1) under low power. Alternatively, the elements recited in this paragraph may be used in a topology where the inductor Lf is moved to the output path (such as is shown in FIG. 13a).

Voltage Boost Resonant Tank Converter:

In another aspect of the present invention, it has been realized by the inventors that it is also possible to build a desired resonant DC-DC converter for providing a high voltage step-up ratio without employing a tank interruption switch $S_x$ as exemplified by the circuit topologies 38 and 40 of FIGS. 13 (a) and 13(b). More generally, this is achieved by employing a number of concepts including: (i) achieving a high boost through the systematic design of a resonant tank; (ii) enhancing converter efficiency using a unipolar/bipolar resonant tank excitation; and (iii) automatic voltage balancing on output capacitors in conjunction with the high boosting resonant tank circuit to yield a high step-up ratio and a balanced bipolar dc output voltage.

Figure 14:
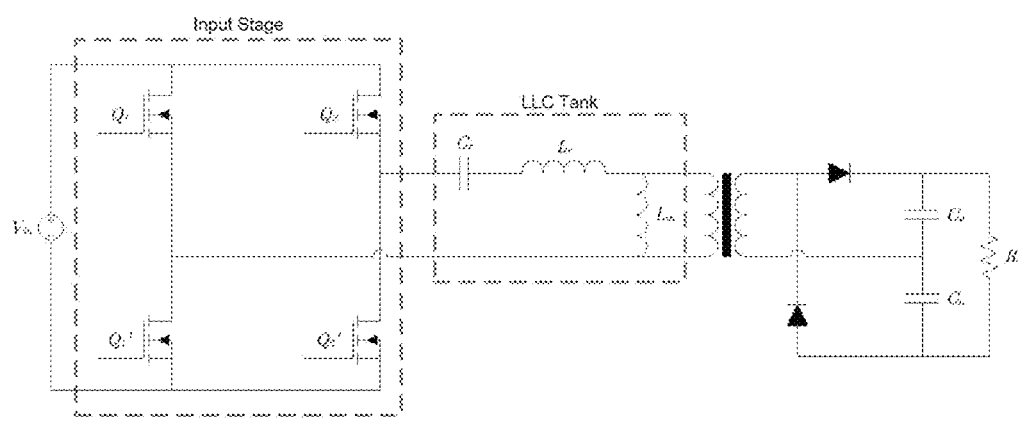
FIG. 14 is a circuit diagram illustrating an alternate implementation of an LLC converter circuit design in accordance with an aspect of the present invention.

More specifically, it is possible to achieve a high boost ratio from the resonant tank through the careful selection of resonant components. An illustrative example is shown in FIG. 14 where an LLC converter circuit design in accordance with an embodiment does not require a high voltage switch. Here, $C_r$ represents a resonant capacitor, $L_r$ represents a resonant inductor, and $L_m$ represents a magnetizing inductor.

Figure 15:
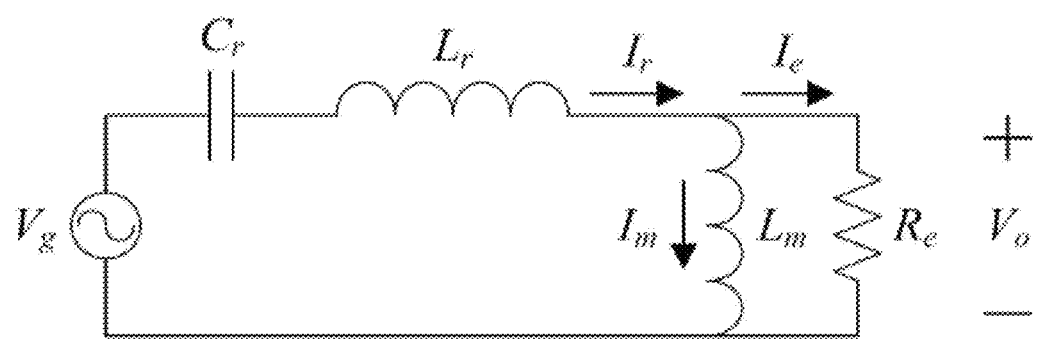
FIG. 15 illustrates a classic LLC circuit topology identifying an input stage and LLC resonant tank.

The "Classic" LLC Circuit DC-DC converter topology shown in FIG. 14 has been studied in literature (R. L. Lin et. al. and H. Hu et. al., above), however most of the prior art is related to step down (buck) realizations of the technology. This type of converter design is commonly used in conventional applications where the output voltage is independent of the load, such as a power supply. In these applications, the classic LLC circuit topology offers advantages compared to other circuit topologies. To illustrate the functioning of the circuit, the voltage gain characteristics of the LLC converter can be approximated using first harmonic approximation (FHA) techniques. Assuming the circuit is stimulated by a perfect sinusoid, one can use conventional circuit analysis to determine the voltage gain of the circuit. The LLC converter under study can be simplified to the circuit shown in FIG. 15 here Re is the equivalent resistance for the resonant tank. This equivalent resistance depends on the type of rectifier used. For the full bridge Re=8R/π2 [H. Huang, above.] where R is the DC load resistance across the full bridge rectifier output.

It can be shown that the voltage gain of the circuit is defined by:

$$M = \frac{V_{out}}{V_{in}} = \left| \frac{\alpha f_n^2}{\alpha f_n^2 + (f_n^2 - 1)(1 + jf_n\alpha Q_e)} \right| \quad (1)$$

where $$\alpha = \frac{L_m}{L_r} \quad (2)$$

$$f_n = \frac{f}{f_0} \quad (3)$$

Figure 16:
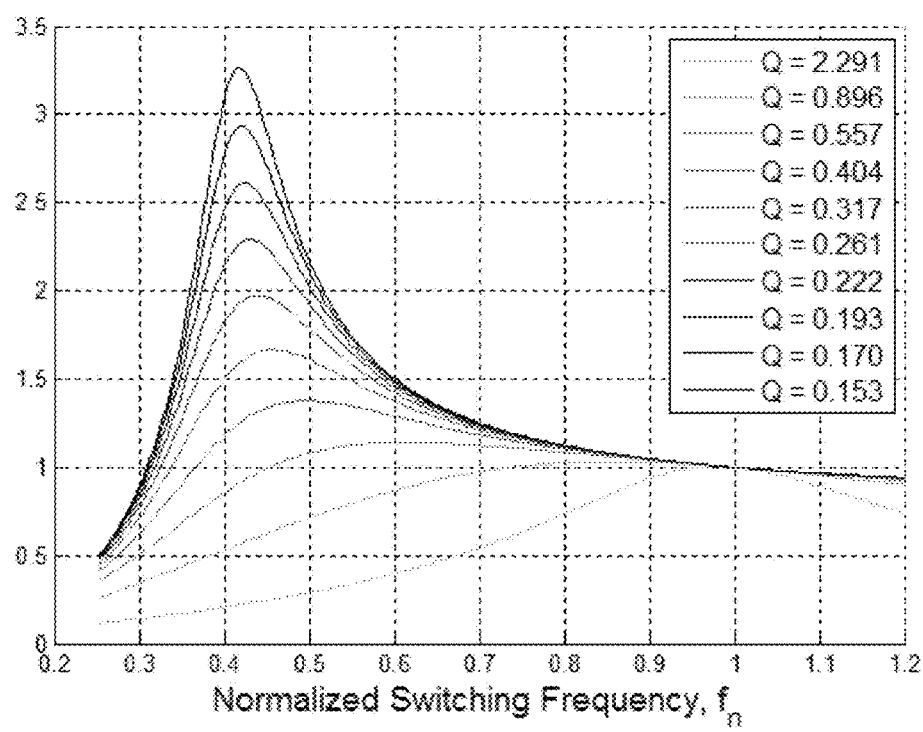
FIG. 16 illustrates the voltage gain achieved with an LLC circuit topology with various loads over a large range of switching frequencies.

The voltage gain can be then calculated for different loadings and frequencies to produce the plots shown in FIG. 16. This figure shows the voltage gain achieved by an "LLC Resonant Tank", as a function of normalized switching frequency of the input stage DC-AC converter.

The different lines are plots at different loading conditions (constant R), or stated alternatively, at different Q values as determined by Equation (4). As seen by the equation, as the load decreases (R decreases), the Q value is reduced in an inverse proportional relationship. In FIG. 16 the darker lines represent low Q values, and the lighter lines represent high Q values.

$$Q = \frac{\sqrt{\frac{L_r + L_m}{C_r}}}{\frac{8R}{\pi^2}} \quad (4)$$

The resonant frequencies of the circuit are defined by fr1 and fr0, defined below:

$$fr1 = \frac{1}{\sqrt{2\pi LrCr}} \quad (5)$$

$$fr0 = \frac{1}{\sqrt{2\pi(Lr + Lm)Cr}} \quad (6)$$

Figure 17:
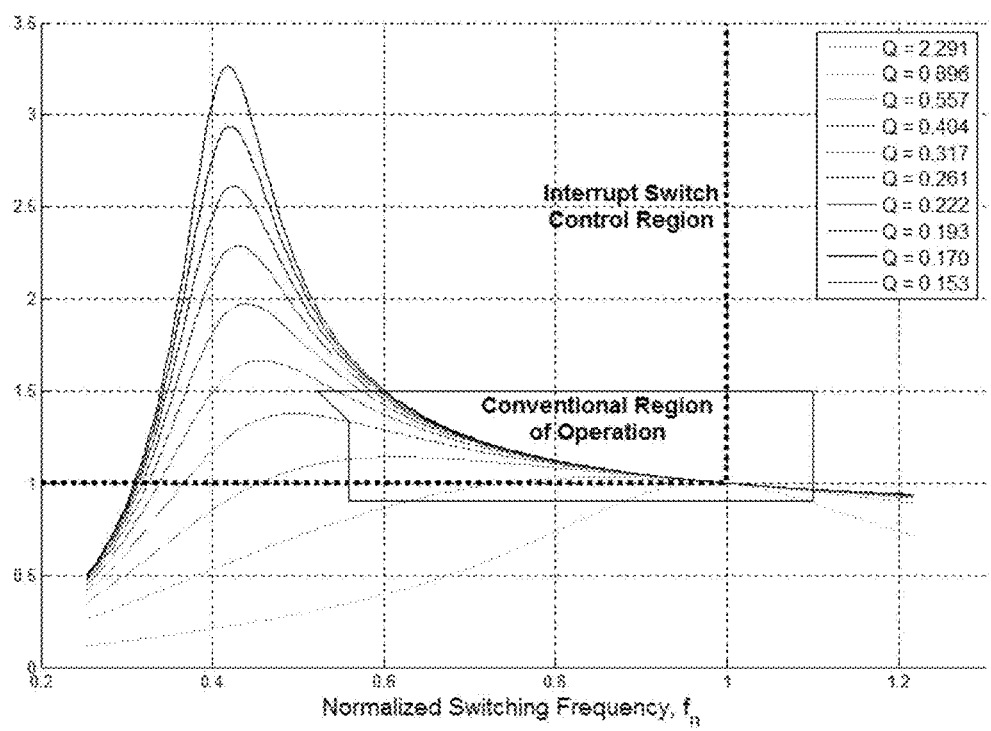
FIG. 17 illustrates the voltage gain achieved with an LLC circuit topology with various loads over a large range of switching frequencies with the conventional region of LLC operation and the Interrupt Switch Control Region denoted.

In conventional applications, such as power supplies, the Classic LLC Circuit is operated near $f_{r1}$ as indicated in FIG. 17 by the box titled, "Conventional Region of Operation", because a constant output voltage is desired throughout the entire load range. The desired ratio between the input voltage and output voltage is predominantly achieved using a transformer in the output stage, and not the LLC Resonant Tank itself. When the input voltage changes, the output voltage is maintained at a constant level by adjusting the switching frequency of the input stage above or below $f_{r1}$. The value of Q is not critical to the operation of the circuit and it only has to be verified that the circuit can provide the required output voltage for the maximum load. Values of Q close or even higher than 1 are common in conventional circuits. It has not been obvious to a person skilled in the art that the Classic LLC Circuit topology can be operated over a frequency range well below $f_{r1}$ ($f_{r1}$ is not within in the operating range) by selecting the components such that the value of Q is well below 1 for the full load range specified. Furthermore, the circuit has not been used in applications that require control of the power transfer between two regulated or unregulated DC sources.

Figure 18:
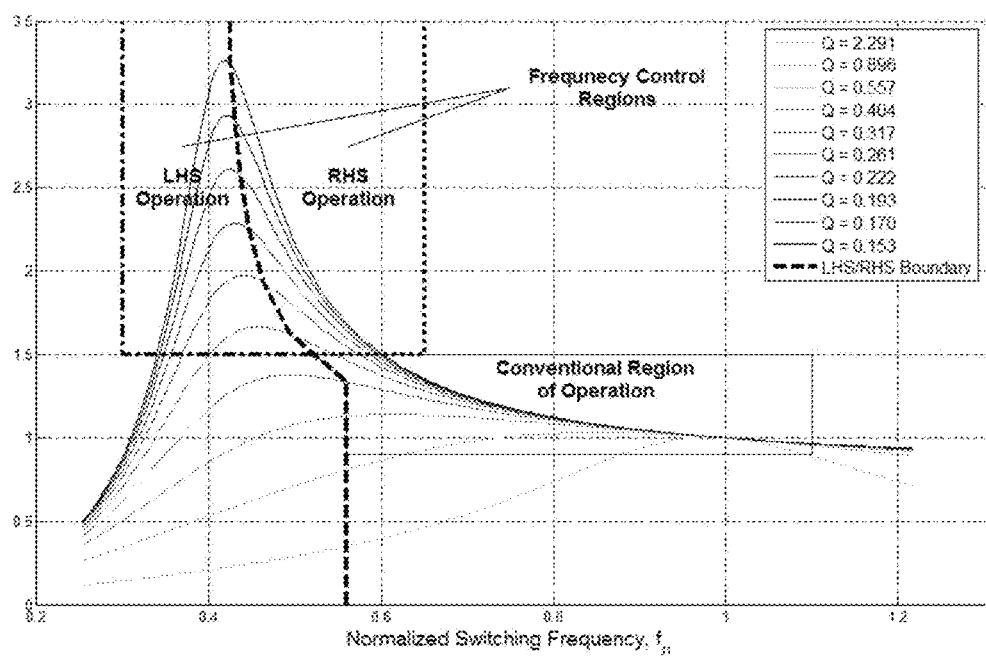
FIG. 18 illustrates the voltage gain achieved with an LLC circuit topology with various loads over a large range of switching frequencies with a number of operating regions denoted: (1) RHS Operation region, (2) LHS Operation region, (3) Conventional Operation region and (4) the LHS/RHS Boundary curve.

In one embodiment of the present invention, the LLC topology is designed to operate with switching frequencies well below $f_{r1}$, close to the second resonant frequency of the circuit, $f_{r0}$. Operation in the area near $f_{r0}$ can be divided into two distinct operating regions as shown in FIG. 18. As shown in the figure, the two regions are named the "LHS Operation" and "RHS Operation" regions. The line which intersects both of these regions is called the "LHS/RHS Boundary", which is also shown in FIG. 18. Operation in the "LHS Operation" region yields zero current switching (ZCS), suitable for switching devices such as IGBTs. Operation in the "RHS Operation" region yields zero voltage switching (ZVS), suitable for switching devices such as MOSFETs. Operating in any one of these regions yields a voltage gain above 1 for loads with Q lower than 1. The values of the resonant tank components can be selected such that the Q value lower than 1 can be achieved for all load values (power transfers) required to be handled by the converter. This Q value would be lower for higher voltage boosting requirements. The system would then operate at a switching frequency below $f_{r1}$ for all steady state operating conditions. A resonant tank circuit designed in accordance with this embodiment will be called a "High Voltage Boost Circuit" (HVBC). All of the embodiments of the invention shown above use a HVBC resonant tank circuit design. The introduction of a transformer to the circuit does not alter the high boost nature of the tank design.

For a specific application, the range of input voltage and the range of load (power transfer) is known. The output voltage is also known based on components to be powered by the converter or the externally regulated voltage bus that is to receive power. The design procedure is then as follows:
1) Choose an $L_m/L_r$ ratio that is suitable for the application. Typical values range from, but are not limited to, 3-10. Large values will result in higher peak currents in the tank, while small values will result in larger switching losses at low loads.
2) Generate voltage gain curves for various values of Q. On that plot, also graph the boundary curve separating LHS and RHS regions, similar to FIG. 18.
3) From the plot, select the Q value whose voltage gain curve intersects with the boundary curve at the desired voltage boost ratio. Note the Q value and normalized frequency ($f_n$) of this intersection point.
4) Using the Q and normalized frequency values found in step 3, calculate the $L_r$ and $C_r$ values.
5) Using the $L_r$ value calculated above and the desired $L_m/L_r$ ratio, calculate $L_m$ Power Flow Control and Strategies for the LLC Boosting Converter In an aspect, the first method discovered to achieve controllability of the above design was the introduction of an interrupt switch in the LLC Resonant Tank (the "Interrupt Switch LLC Circuit"). The interrupt switch allows the Q value to be solely dependent on the input voltage and not the load. As the input voltage increases, the Q value decreases. The Input Stage switching frequency of the circuit is used to compensate for changes in the input voltage and the off time of the interrupt switch is used to adjust to the changes in load. The decoupling of the load (using the interrupt switch in the LLC Resonant Tank) from the input voltage (using the Input Stage switching frequency) allows for a simple implementation of a controller and stable control.

As disclosed in earlier described embodiments, the introduction of an interrupt switch into the LLC Resonant Tank also enables the use of the Interrupt Switch LLC Circuit in new applications where the LLC Resonant Tank is operated in the conventional region of operation close to fr1. The use of the Classic LLR Resonant Circuit in this operating region is not easily realizable with the classic frequency control method. In other words, the Interrupt Switch LLC Circuit is suited to new applications where the objective of the LLC circuit is not to regulate the output voltage but instead to regulate the power delivered to a constant output voltage regulated externally.

Figure 19:
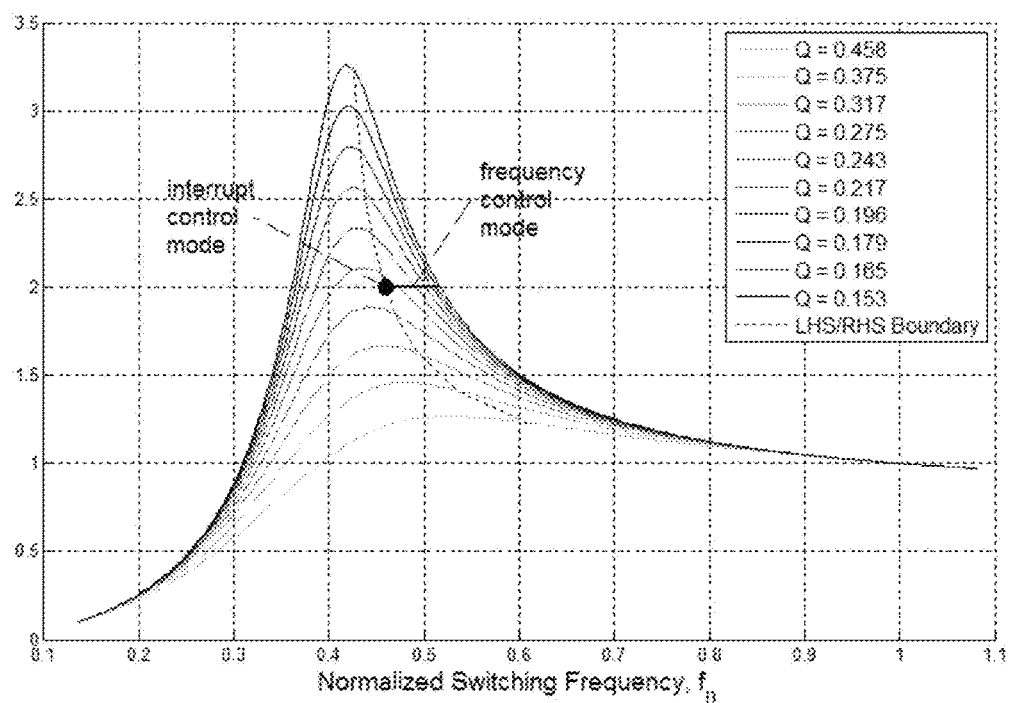
FIG. 19 illustrates a voltage gain graph of the LLC converter using First Harmonic Approximation (FHA) in accordance with an embodiment.

Through experimentation with the Interrupt Switch LLC Circuit topology for a solar photovoltaic application, it was discovered by the inventors that when operating the LLC Resonant Tank with a minimum boosting above 1.25 over the entire operating range, it was unnecessary to decouple the load from the input voltage via the interrupt switch. It was determined that, within this region of operation a change in either the input voltage or the switching frequency results in a corresponding change in load (power transfer). This is a result of a horizontal separation amongst the load curves in this region, which is not the case in the Conventional Region of Operation. As a result, the power flow can be controlled by changing the switching frequency, while simultaneously maintaining a given boosting ratio as shown in FIG. 19. This is possible within the specified region of operation and is accomplished by shifting the operating point to a new load (Q) curve. The reduced frequency range of operation necessary to control the load is small, which results in chopping of much smaller currents than in conventional non-boosting LLC circuits. Losses in magnetic materials and dielectric materials within the inductors and capacitor can also be reduced because component may be optimized for a small frequency range.

Detailed High Voltage Boost Circuit (HVBC) Operation

The operation of the HVBC will now be described in more detail. As discussed, the HVBC is operated in a unique mode of operation. FIG. 18 shows the typical voltage gain that can be achieved with an LLC circuit. The different lines in FIG. 18 represent the same tank circuit with different loads. The lines then trace out the voltage gain from the converter when operated from about 0.4 times the resonant frequency $f_{r1}$ to 1.2 times the resonant frequency $f_{r1}$.

Conventionally, LLC power supplies are designed to operate near the resonant frequency defined by the resonant inductor and resonant capacitor, $f_{r1}$. This region of operation can be seen in FIG. 17 with the resonant frequency $f_{r1}$ denoted. When operated in this region near $f_{r1}$, the circuit will exhibit constant voltage gain throughout the entire load range. FIG. 17 also shows the Interrupt Switch Control region, which covers parts of the conventional region of operation.

In the present HVBC embodiment, the LLC is designed such that it is operating very close to the resonant frequency determined by the resonant inductor, magnetizing inductor and the resonant capacitor, which will be referred to as fr0. In FIG. 18, this operating region is outlined and labeled "LHS Operation" and "RHS Operation". In these regions of operation, the circuit is able to achieve high boost ratios yet also achieve a reduced switching loss throughout a wide load range. Output power is controlled by varying the switching frequency, which need only be varied by about 10% of the resonant frequency.

It will also be appreciated that the regions of operation as defined by FIGS. 17, 18 and 19 are for demonstration purposes only, and as such, they are not fixed to those values depicted in the figures. One of the defining characteristics of the present invention is that the resonant tank is designed and optimized such that it can provide a voltage boost when stimulated with an AC voltage whose frequency is less than $f_0$, or less than a normalized frequency of $f_n=1$, as shown in FIGS. 17, 18 and 19. In FIG. 19, the frequency control mode may have any value of gain greater than 1, and the circuit need only be optimized for this different gain value. In FIG. 18, the borders of the "Conventional Region of Operation", "RHS Operation" and "LHS Operation" regions are not fixed, except for the border between the "RHS Operation" and "LHS Operation" region. This line is defined by the points where the resonant tank appears as a resistor to the AC stimulator, as described in the illustrative design example. The "Conventional Region of Operation" is focused around $f_0$, or a normalized frequency of $f_n$=1 in FIG. 18. The "LHS Operation" and "RHS Operation" regions are focused around $f_1$, or a normalized frequency of about $f_n$=0.45 in FIG. 18. This normalized value will be different for every unique resonant tank design. In the same way the borders of FIG. 18 are not fixed, the regional borders of FIG. 17 are also not fixed, and are only drawn this way for demonstration purposes.

Figure 20:
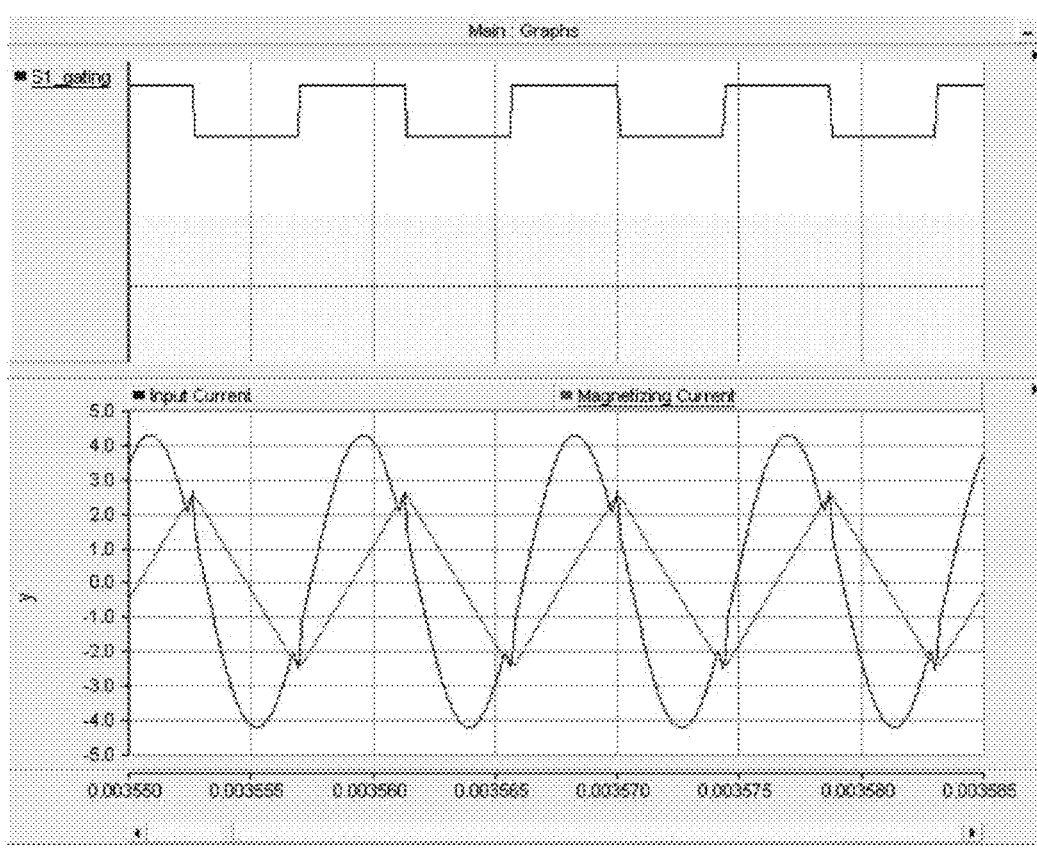
FIG. 20 illustrates how conventional LLC reoanant converter control their voltage boost, and therefore, their power flow.
Figure 21:
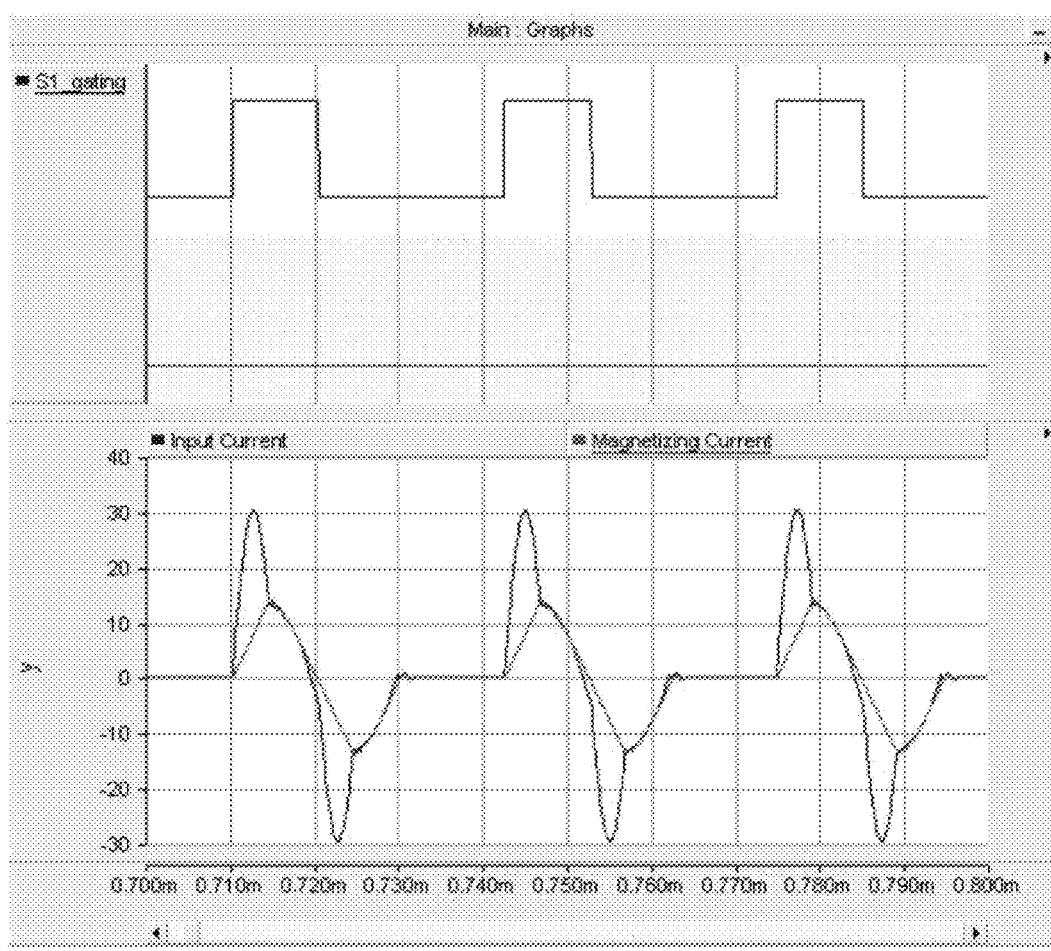
FIG. 21 illustrates an LLC tank current waveform using an interrupt switch in accordance with another aspect of the present invention.

FIG. 20 shows the current waveform flowing out of the switching network in a conventional LLC circuit. Due to operation at $f_{r1}$, the switching network must switch a very significant magnetizing current as compared to the peak current. FIG. 21 shows the waveforms associated with an embodiment of the circuit using an interrupt switch in accordance with another aspect of the present invention. The interrupt switch waits until negligible current is flowing in the switch, and opens the switch at near zero current. This effectively means the circuit is operating approximately on the ZCS/ZVS boundary shown in FIG. 18, at the boundary between the "LHS Operation" and "RHS Operation" regions. Power is controlled by introducing a "hold" state as shown in FIG. 21. For full power operation, the hold state would be reduced to zero.

Figure 22:
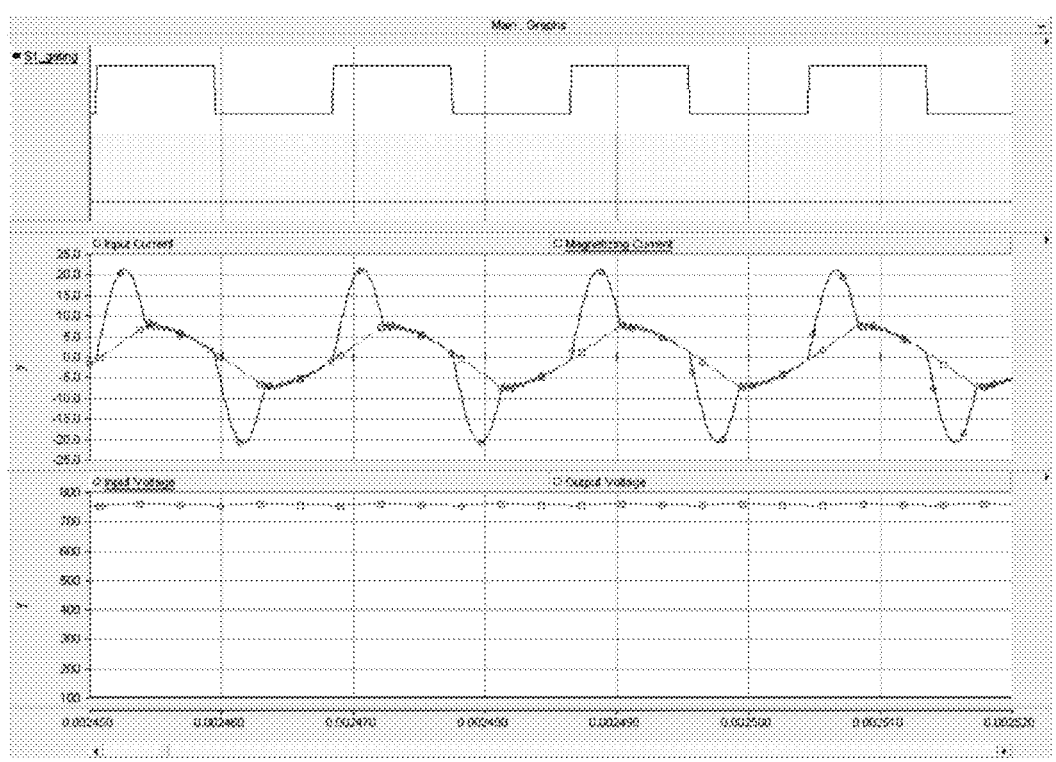
FIG. 22 illustrates an LLC tank current operating near full power in accordance with another aspect of the present invention.
Figure 23:
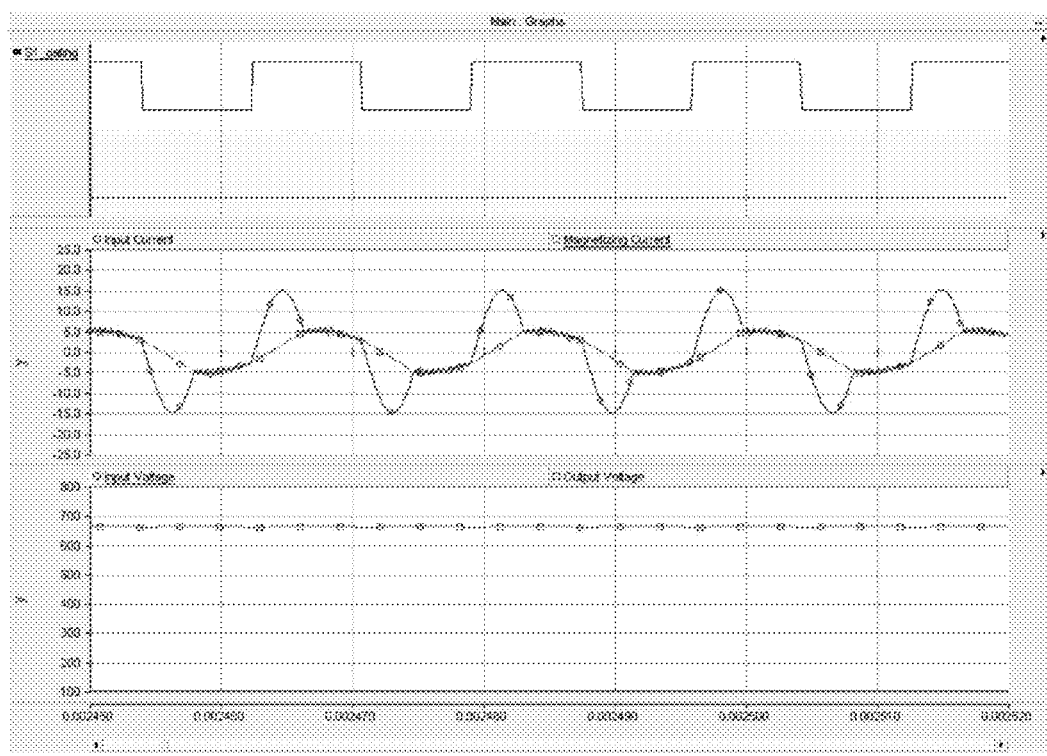
FIG. 23 illustrates an LLC tank current operating at low power in accordance with another aspect of the invention.
Figure 24A:
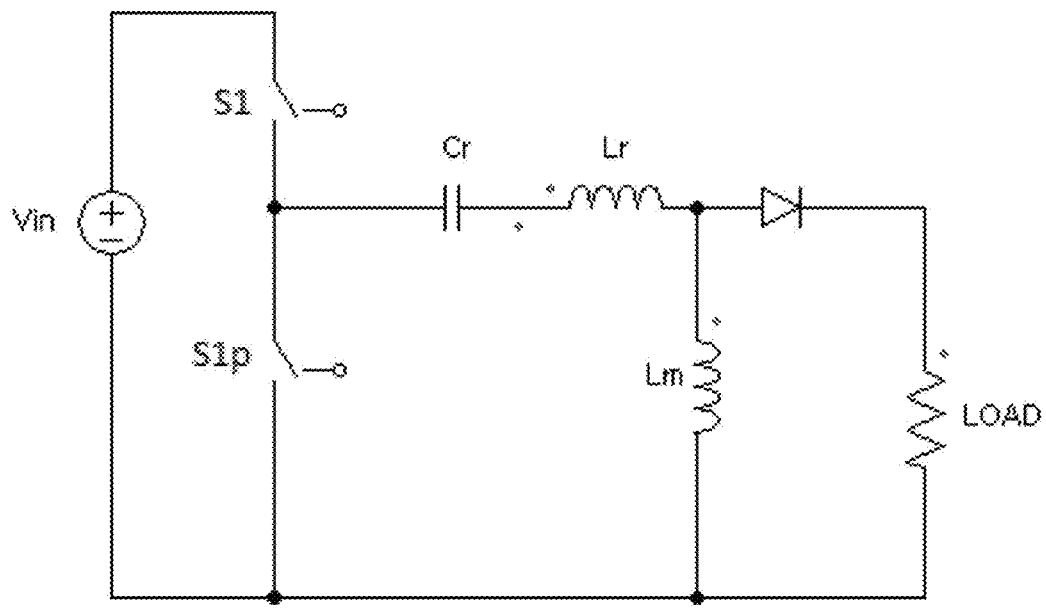
FIGS. 24(a), 24(b), 24(c) and 24(d) illustrate four representative implementations of the resonant DC-DC converter of the present invention using a single interrupt switch.
Figure 24B:
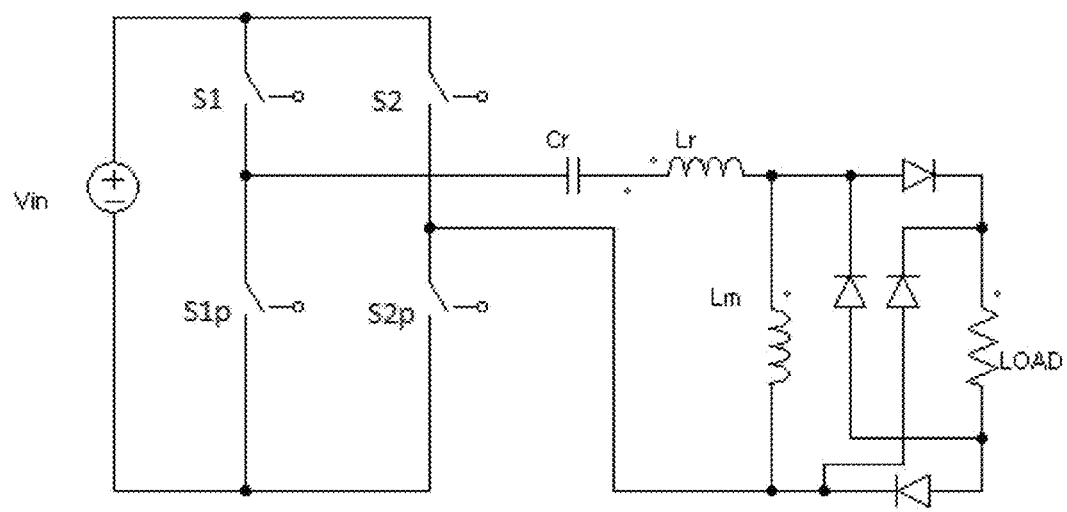
Figure 24C:
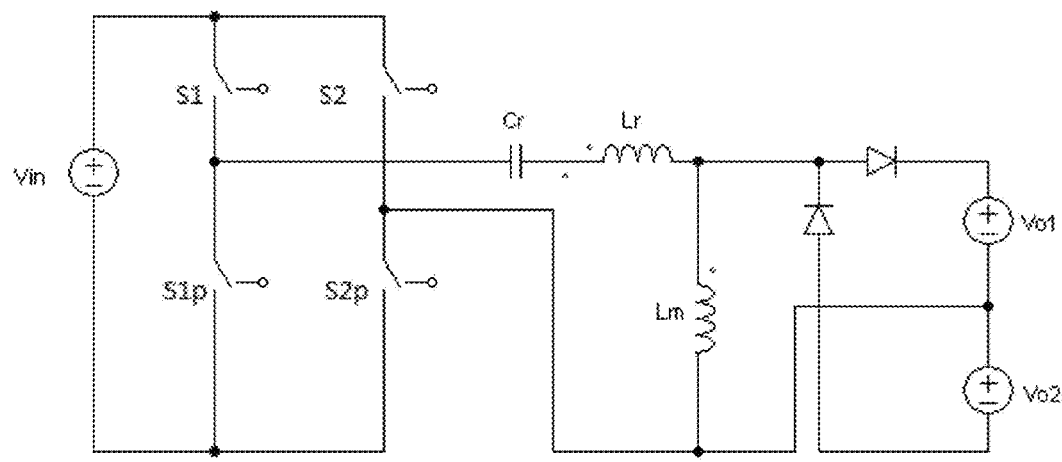
Figure 24D:
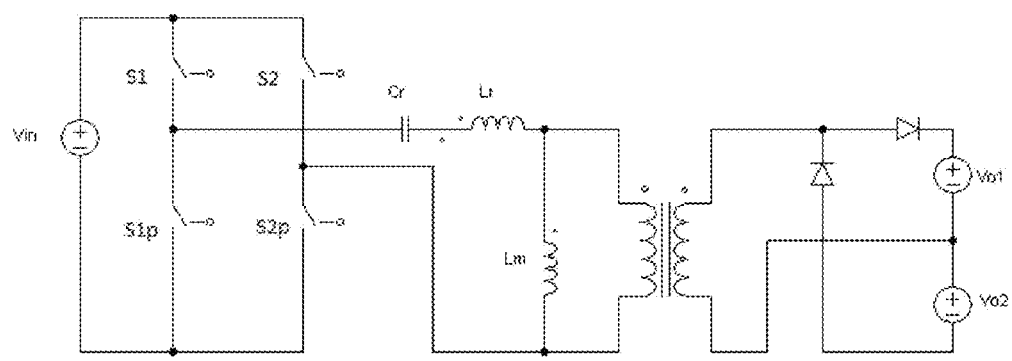

Now referring to FIG. 22, shown is a proposed mode of control over the presently described HVBC embodiment. At full power, the waveform will resemble the full power waveform of the circuit with the interrupt switch, with switching happening at or very near the zero crossing of the current. Power reduction, however, is achieved not by introducing a hold state, but rather by slightly increasing the switching frequency of the converter as shown in FIG. 23. Switching action now occurs somewhat prior to the zero crossing; however the currents at the time of switching are very small, which can be seen in FIG. 23. Due to the low Q operation over the entire load range only small variations in the switching frequency are necessary to regulate power from full load to zero load. In FIGS. 22 and 23, the switching frequency is increased from 55.5 kHz to 59.7 kHz and the power transfer is reduced by about 25%.

Embodiments of the present invention that use the switching frequency of the converter to control the power flow may produce particular results 50 that include gating signals for the converter of FIGS. 24(a), 24(b), 24(c) and 24(d), together with the important current waveforms. The following is a description of a possible switching cycle method for an embodiment of the present invention utilizing a full-bridge DC-AC inverter and a split output circuit, operating in the "RHS Operation" region. The waveforms are shown in FIG. 22 for full load and FIG. 23 for partial load:

1. At the beginning of a cycle, a positive charge exists on the capacitor. The switching cycle begins with the turning on of switches $S_1$ and $S_{2p}$. The current in the resonant tank may be less than or equal to zero at this moment. Thereafter energy may be transferred into the resonant tank and because there is enough voltage to forward bias the output rectifier diode, current is injected to the load.
2. The resonance will reduce the voltage in Cr and will increase the current in the inductor Lr. Lm has a constant voltage equal to $V_{o1}$ across it. The voltage across Cr will turn negative and the current across Lr will start decreasing.
3. When the current across Lr equals the current across Lm, the output rectifier stops conducting and no current is transferred to the load. At this point, Lm is included in the resonance and the same current flows through Lr and Lm.
4. Switches $S_1$ and $S_{2p}$ are then turned off; almost immediately thereafter switches $S_2$ and $S_{1p}$ are turned on. This commences the second half cycle which is symmetrical to the first.
5. The length of the switching period may be varied to control the power flow through the converter.

Although the control descriptions are based on the circuit using a full bridge DC-AC converter and the split output circuit, a person skilled in the art could be able to identify that the general operation is similar in other embodiments. Differences in the number of pulses transferred per period, the type of load receiving the power pulses, or the location of the components used to produce the resonance amongst others do not change the operation principles for the circuit.

The benefits of the circuit over the classical LLC converter control are: (i) a significantly longer switching period (approximately 2 times) for a given set of components (ii) a reduction in switching losses; (iii) a reduction in losses within the resonant tank (comprised of $C_r$, $L_r$ and $L_m$); and (iv) the ability to regulate power transfer between two externally regulated DC sources.

Unipolar/Bipolar Resonant Tank Excitation Control

As described earlier, switching of the DC/AC converter may be carried out such that the DC/AC converter output is either an AC waveform of +V1 and −V1, or an AC waveform of either V1 and 0 or −V1 and 0. The ability to switch between these modes of operation will be called "Unipolar/Bipolar Resonant Tank Excitation Control". Unipolar/Bipolar Resonant Tank Excitation Control changes how the resonant tank is excited in order to operate the converter in its most efficient control mode for a given input power.

Auto Balancing Output

As shown in FIG. 6(c) and FIG. 7, an embodiment of the invention includes a voltage doubling rectifier, which creates a bi-polar output. This bi-polar output must be balanced in order to properly maintain the output DC link. Due to the boosting nature of the converter, the output capacitors, Co in FIG. 14, are automatically balanced. When one of the capacitors has a lower voltage than the other, the operating point of the converter moves vertically down the curves shown in FIG. 18. Moving down these curves corresponds to a higher Q value, or larger load. A larger load means more power will be transferred, which will in turn charge the capacitor back to its nominal operating voltage. No other control circuitry is needed.

In summary, the focus of the present embodiment is on a unique mode of operation that yields a large voltage boost in the resonant tank. This voltage boost allows the present HVBC embodiment to achieve very high efficiencies at high conversion ratios. With the present HVBC design, the resonant tank of an LLC converter can be designed to yield high voltage gain, useful for step up converters. As well, the converter can be operated with a low Q over the entire load range. This is achieved by knowing the load, and designing the resonant components around it. Furthermore, the resonant tank can be stimulated near the resonant frequency fr0, and operation of the converter in this region yields to ZVS, and low current switching (LCS), to yield a highly efficient, step up converter.

Comparative Analysis of Interrupt Switch Control Vs. Frequency Control for Boosting LLC Tank Circuits As noted above, both interrupt switch control and frequency control may be used for boosting LLC Tank Circuits. This analysis focuses on the application of the interrupt switch concept to LLC converter applications and compares it to frequency control of the LLC converter.

Resonant converters are designed to transfer power from an input source to an output load. The output voltage divide by the input voltage is referred to as the gain of the converter. The theoretical gain of the LLC converter can be approximated using first harmonic approximation (FHA) techniques. It is then analyzed using the simplified approximate circuit shown in FIG. 15, where $Re=8R/\pi^2$ [See H. Huang, "LLC Resonant Half Bridge Converter", Texas Instruments Presentation from Asia Tech-day, Aug. 27, 2009] and R is the dc load resistance across a conventional full bridge output rectifier.

In many applications we wish to supply a constant output voltage, $V_o$, from a given input voltage source, approximated by $V_g$. Based on the simplified model, the amount of current, $I_m$, flowing in Lm will be constant for a given $V_o$. In contrast, the amount of current flowing in the load, $I_e$, will depend on the load resistance $R_e$.

The current, $I_r$, seen by the input ac source, the capacitor $C_r$ and the inductor $L_r$, therefore has two components:
  (i) the component $I_m$, set by the desired $V_o$.
  (ii) the component $I_e$, set by the loading The current $I_m$ itself transfers no power to the load, it is merely required to enable the process of energy transfer.

At higher load $I_e$ comprises a large percentage of $I_r$, leading to highly efficient operation.

Using frequency control, lighter loading conditions result in $I_m$ comprising a larger percentage of $I_r$. Since numerous losses are related the amplitude of $I_r$, efficiency will suffer at light load conditions. Particularly at power levels below 15% of rated power, the efficiency typically becomes very poor.

The interrupt switch enables a high $I_e$ to $I_r$ ratio to be employed under all loading conditions. At full load the $I_e$ to $I_r$ ratio is high by its very nature, posing no challenge. To operate at reduced load the interrupt switch introduces a near zero loss hold state. This yields an efficiency that is roughly independent of loading conditions. It should also be noted that each time the convert leaves the hold state one pulse of energy is transferred to the output. For a given input and output voltage the size of this energy pulse is constant. Power transfer is controlled by merely regulating the number of energy pulses that are released by the interrupt switch.

FIG. 22 shows a comparison of where the interrupt circuit operates versus where the frequency control circuit operates for a fixed $V_g$ to $V_o$ ratio of 1:2. Note that only one point is shown for the interrupt circuit operation. The interrupt switch pulses the power to the output always at one point on this plane. By controlling the pulse density the amount of power transfer is linearly controlled.

Under frequency control we operate along a horizontal line, moving to higher frequencies to decrease power. The amount of power transfer varies nonlinearly with the operating frequency.

A clear negative impact of employing the interrupt switch is that this device adds additional conduction losses to the resonant tank circuit.

This leads to a trade-off between low power and high power efficiency as follows:

A converter that operates predominantly at a small percentage of its rated power will benefit from the interrupt switch, since efficiency is held high even at low power transfer through the interrupt process.

A converter that operates predominantly at a large percentage of its rated power will benefit from elimination of the interrupt switch, since efficiency of the converter is already high due to the large power transfer. Elimination of the interrupt switch conduction loss can be beneficial.

Benefits of Interrupt Switch Control

The following is a list of benefits of the interrupt switch.
High efficiency at low power as noted above
The power transfer between two fixed voltage sources is proportional to the time interval between interrupt switch turn-on events. This enables simple control of the circuit.
The power transfer between to the output is easily controllable even under lower boost ratios.
Use of the interrupt switch reduces switching losses in the input DC/AC converter that is supplied by $V_g$ by ensuring soft-switching.

Drawbacks of Interrupt Switch Control

The following is a list of drawbacks of the interrupt switch.
Addition of switch conduction loss to the tank circuit, reducing high power efficiency.
Component cost.

Benefits of Frequency Control

The following are benefits of the using frequency control in place of interrupt control in an LLC converter.
Efficiency at high power can be enhanced through elimination of conduction losses associated with interrupt switch.
Reduction in component cost, due to elimination of interrupt switch.
Reduction in both input and output dc filter size Drawbacks of Frequency Control The following are drawbacks of the using frequency control in place of interrupt control in an LLC converter.
Low efficiency at light loads
Highly nonlinear power transfer equation leading to more challenging controller design
Control challenges in regulating power flow between two fixed voltage sources when the boost ratio is low.

Application Examples of the Classic LLC Circuit Operating in the Novel Region of Operation:

Using an operating range on the right hand side of the peak is implemented with MOSFETs, because these switches have favorable performance when operated with zero voltage switching ("RHS Operation" as illustrated in FIG. 18).

Using an operating range on the left hand side of the peak is implemented with IGBTs, because these switches have favorable performance when operated with zero current switching ("LHS Operation" as illustrated in FIG. 18).

RHS Operation for use in low voltage applications.
LHS Operation for use in high voltage applications.

Such applications include, but are not limited to, solar photovoltaic systems, fuel cells, permanent magnet wind turbines, electric and hybrid vehicles, electric charging stations, aerospace applications, marine applications, micro-grids, energy storage and other systems that require converters with varying input voltage and load.

Application Examples of the Interrupt Switch LLC Circuit Operating in the Novel Region of Operation:

The interrupt switch topology is used in two main applications:

1. In applications where a high efficiency is desired and the converter operates at low power for long periods of times, such as standby power applications.
2. In low boosting applications where the power flow between two voltage sources needs to be controlled, including but not limited to, i) residential application of solar photovoltaic systems (including module level optimizers and micro-inverter), fuel cells, permanent magnet wind turbines, micro-grids and energy storage; ii) small power marine and aerospace applications (low voltage); and iii) and other systems that require converters with varying input voltage and load at low input and output voltages.

Illustrative Design Example

This design example illustrates how the selection of appropriate components in an LLC converter can yield the desired low Q operation. A brief overview of the theory will be presented followed by a step-by-step design example. The document concludes with a discussion section about the component selection.

The theoretical gain of the LLC converter can be approximated using first harmonic approximation (FHA) techniques. Assuming the circuit is stimulated by a perfect sinusoid, one can use conventional circuit analysis to determine the voltage gain of the circuit. The LLC converter under study can be simplified to the circuit shown in FIG. 15 where $Re=8R/\pi^2$ [H. Huang, above.] and R is the DC load resistance across a conventional full bridge output rectifier.

It can be shown that the voltage gain of the circuit is defined by:

$$M = \frac{V_{out}}{V_{in}} = \left| \frac{\alpha f_n^2}{\alpha f_n^2 + (f_n^2 - 1)(1 + jf_n \alpha Q_e)} \right| \quad (7)$$

where $$\alpha = \frac{L_m}{L_r} \quad (8)$$

$$f_n = \frac{f}{f_0} \quad (9)$$

$$Q = \frac{\sqrt{L_r/C_r}}{R_e} \quad (10)$$

$$f_0 = \frac{1}{2\pi\sqrt{L_r C_r}} \quad (11)$$

Furthermore, one can find a transfer function between the input voltage and the resonant current, Ir. The phase of the resonant current determines the region of operation of the converter. For example, if the resonant current is leading the input voltage, the LLC converter is in the "LHS Operation" region. Conversely, when the resonant current is lagging the input voltage, the converter is in the "RHS Operation" region. The border between the two regions is where the resonant tank behaves like a perfect resistor. The dashed line in FIG. 18 shows this border.

The values that make up the dashed line can be determined by setting the imaginary part of the input voltage to resonant current transfer function to zero. The result is to solve for the roots of the following quadratic equation in $\omega 2$ ($\omega=2\pi f$):

$$R_e^2 \omega^2 (L_r C_r R_e^2 + L_m C_r R_e^2 - L_m^2) - \omega^4 L_m^2 L_r C_r = 0 \quad (12)$$

For voltage boosting applications, the circuit must be designed such that it can operate with voltage gains greater than 1. In FIG. 18, this is achieved by designing the converter around a low Q value. As shown, lower Q values provide a larger voltage boost at the output. In addition to a low Q value, the converter will be operated at switching frequencies closer to the dashed line. These observations are in contrast to traditional LLC designs, where the converter is designed with larger Q values and operated near the resonant frequency, f0. Designs that follow these traditional constraints exhibit unity voltage gain for all loads.

Converter Design Procedure

This section will present an iterative design procedure to design the components for an LLC circuit based on a low Q operation.

Consider the following design constraints:
$V_{in\ minimum}=50V$
$V_{out}=200V$
$P_{max}=500\ W$
$f_{switching\ minimum}=300\ kHz\pm5\ kHz$ Therefore, we can determine:
$R=V_{out}^2/P_{max}=80\Omega$
$R_e=8R/\pi^2=64.8\Omega$
$M=V_{out}/V_{in}=200V/50V=4$ Using these design constraints, the $C_r$, $L_r$, and $L_m$ need to be determined. Therefore, we are trying to determine what resonant components will yield a voltage gain of 4 right at the border of the RHS and LHS operating regions based on the design constraints listed above.

Design Steps

1) Choose an $L_m/L_r$ ratio that is suitable for the application. Typical values range from, but are not limited to, 3-10. Large values will result in higher peak currents in the tank, while small values will result in larger switching losses at low loads.

2) Generate voltage gain curves for various values of Q. On that plot, also graph the boundary curve separating LHS and RHS regions, similar to FIG. 25.

3) From the plot, select the Q value whose voltage gain curve intersects with boundary curve at the desired voltage boost ratio. Note the Q value and normalized frequency ($f_n$) of this intersection point.

4) Using the Q and normalized frequency values found in step 3, calculate the $L_r$ and $C_r$ values using equations 9, 10 and 11.

Figure 26A:
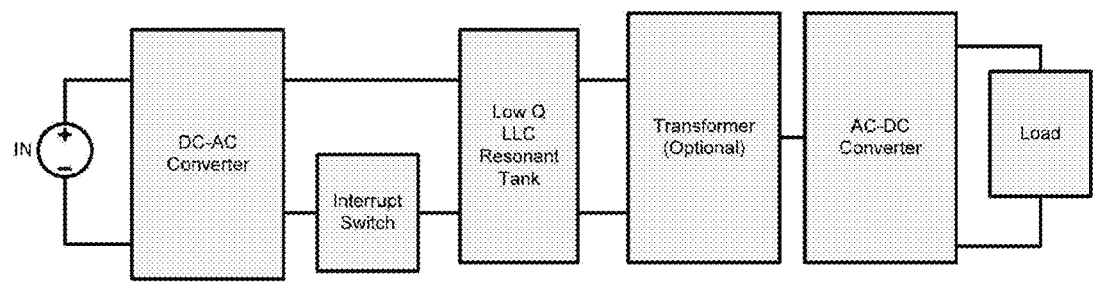
FIGS. 26(a) and 26(b) show the general form of the current invention.
Figure 26B:
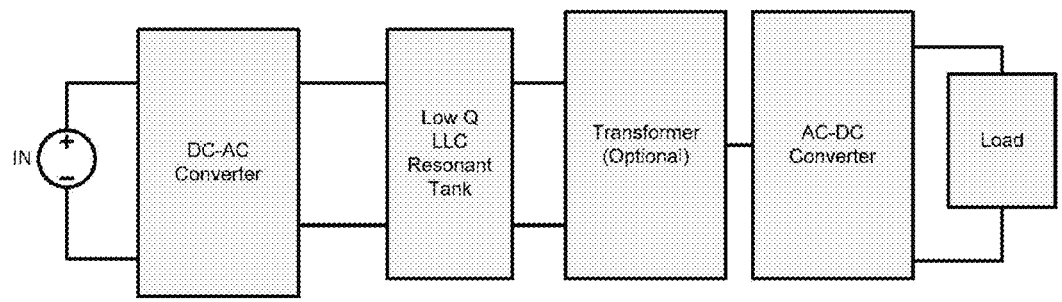

5) Using the $L_r$ value calculated above and the desired $L_m/L_r$ ratio, calculate $L_m$ The design process can be easily automated through software and can be applied to any general form of the LLC circuit as shown in FIG. 26(a) with the interrupt switch and FIG. 26(b) without the interrupt switch.

Converter Design

This section will implement the design steps presented in the previous section to the converter constraints listed above.

1) Select an $L_m/L_r$ ratio of 5.

Figure 25:
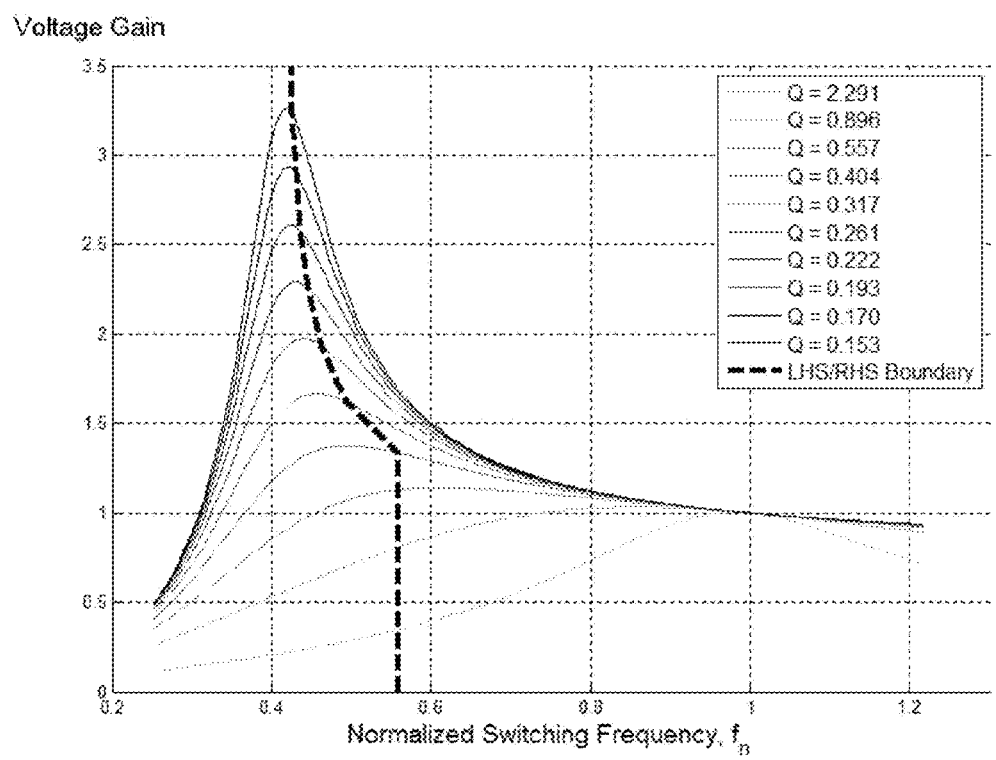
FIG. 25 illustrates the voltage gain achieved with an LLC circuit topology with various loads over a large range of switching frequencies with LHS/RHS Boundary curve denoted.
Figure 27:
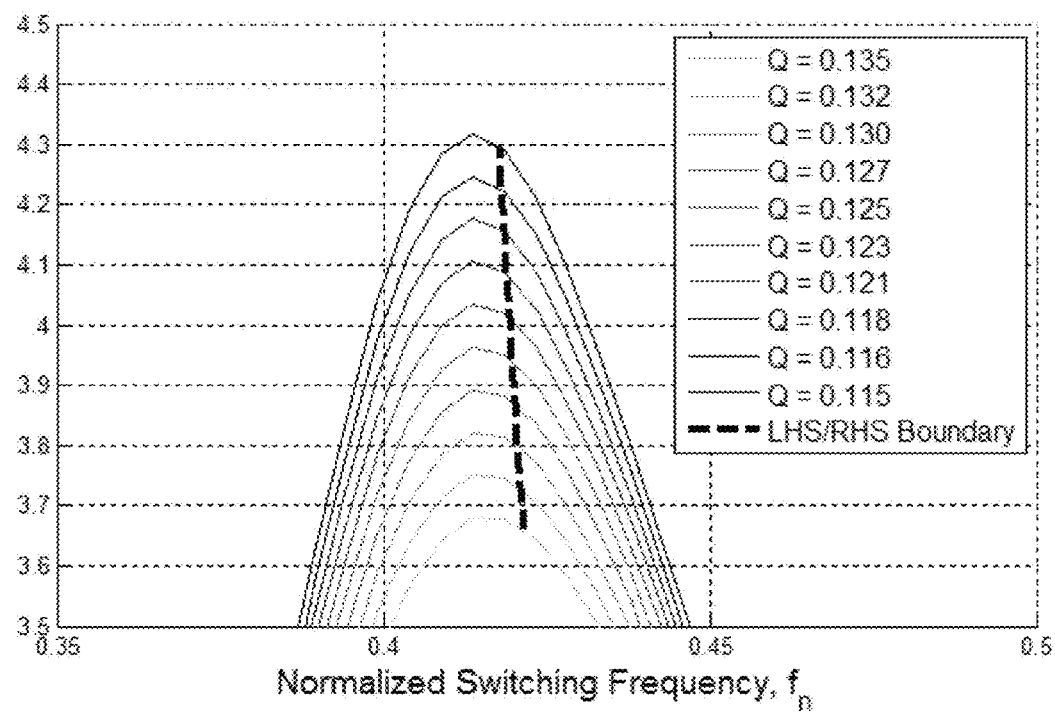
FIG. 27 illustrates voltage gain curves for the LLC converter focused around a voltage gain of 4 in accordance with an embodiment.

2) Zooming in on the voltage gain curves of FIG. 25 yields FIG. 27.

3) From the plot, choose a Q value of 0.123. This voltage gain curve intersects the resistive mode curve (the dashed line) at about $0.42 \times f_0$.

4) Assigning $f_0 = f_{switching\ minimum}$ and using equations 9, 10 and 11, the $L_r$ and $C_r$ values can be determined to be:
$C_r=28\ nF$
$L_r=1.8\ \mu H$ 5) Using the $L_r$ value and the chosen $L_m/L_r$ ratio of 5, $L_m=9\ \mu H$.

Figure 28:
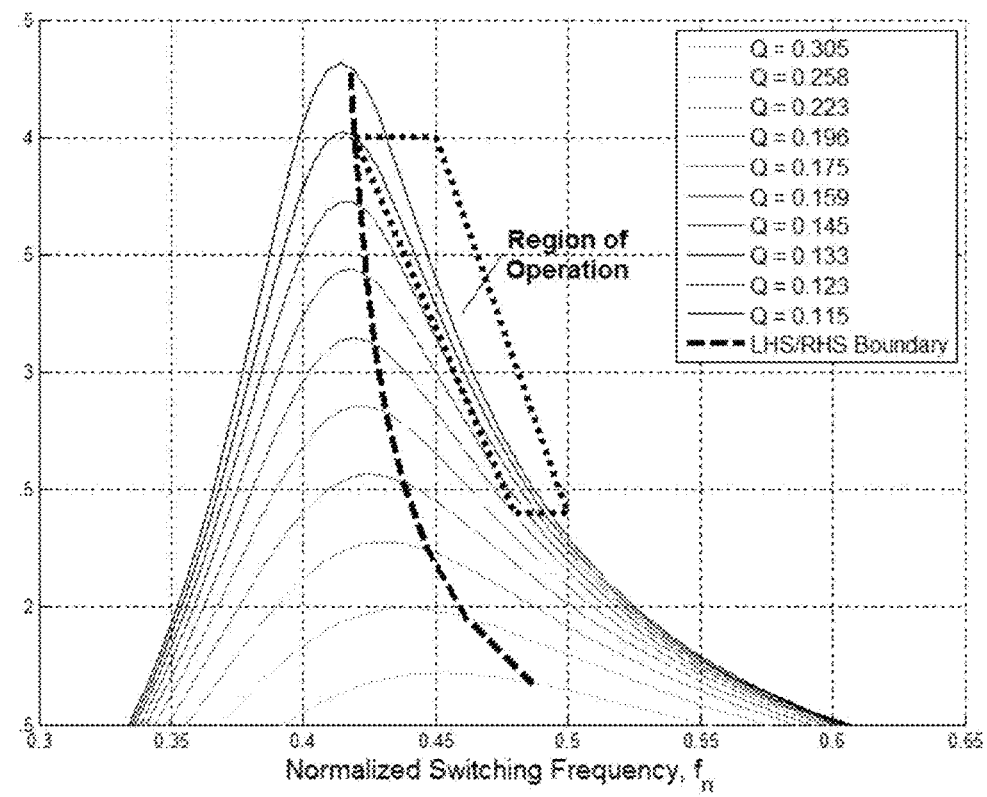
FIG. 28 illustrates a final converter design in accordance with an embodiment, with the region of operation identified.

The final converter design can then have LLC components with the following values:
$C_r=28\ nF$
$L_r=1.8\ \mu H$
$L_m=9\ \mu H$
$Q_{max}=0.123$ FIG. 28 shows the voltage gain curves of the designed converter, as well as the region of operation. Note how the region of operation remains in the "RHS Operation" region.

Resonant Tanks that Yield Low Q

The converter designed in the previous section is unique for the given constraints and the selected $L_m/L_r$ ratio. However, each time the designer selects new constraints, a new set of components must be calculated. As a consequence, there are in infinite number of different LLC converters that operate with high boosting and low Q. Table A shows a small sample of possible resonant tank component values for converters designed to operate at 300 kHz and various Q and voltage boosting values.

TABLE A

| Vo/Vg | $f_{sw}$ (kHz) | R (Ω) | $C_r$ (nF) | $L_r$ (μH) | $L_m$ (μH) | Q |
|---|---|---|---|---|---|---|
| 8 | 302 | 80 | 52 | 1.1 | 4.3 | 0.07 |
| 2 | 298 | 40 | 28 | 2.5 | 10 | 0.29 |
| 4 | 296 | 80 | 27 | 2.25 | 9 | 0.14 |
| 4 | 302 | 40 | 53 | 1.1 | 4.4 | 0.14 |

This design methodology is used to design resonant LLC converters with high voltage gain. Traditionally, resonant LLC converters are designed with unity voltage gain, for voltage step down conversion. As a result, traditional designs will have larger Q values, and will operate near the resonant frequency $f_0$.

It will be appreciated by those skilled in the art that other variations of the embodiments described herein may also be practiced without departing from the scope of the invention. Other modifications are therefore possible. A skilled reader will recognize that there are numerous applications for the DC-DC converter technology described. The DC-DC converters of the present invention may provide an efficient, low cost alternative to numerous components providing high input-to-output voltage conversion. Moreover, DC-DC converters with high amplification ratios that are embodiments of the present invention may be used to create a fixed voltage DC bus in renewable/alternative energy applications.

The steps of a method, process, or algorithm described in connection with the implementations disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed implementations is provided to enable any person of ordinary skill in the art to make or use the disclosure. Various modifications to these implementations will be readily apparent to those of ordinary skill in the art, and the generic principles defined herein may be applied to other implementations without departing from the spirit or scope of the disclosure. Thus, the disclosure is not intended to be limited to the implementations shown herein but is to be accorded the widest scope consistent with the principles and novel features disclosed herein.

What is claimed is:

1. A method of operating a resonant LLC DC-DC converter to regulate power transfer, the method comprising:
   providing a resonant LLC DC-DC converter having at least a lower resonant frequency and an upper resonant frequency;
   operating the converter at a first switching frequency proximate the lower resonant frequency to provide a first power transfer rate at a first voltage gain; and
   operating the converter at a second switching frequency proximate the lower resonant frequency to transition to a second power transfer rate at a second voltage gain.

2. The method of claim 1, further comprising operating the resonant LLC DC-DC converter in a boost mode over a full envelope of voltage and load conditions.

3. The method of claim 1, further comprising selecting resonant inductor, magnetizing inductor and resonant capacitor components that yield voltage gains of at least 1.1 over an entire range of operation.

4. The method of claim 3, further comprising selecting resonant inductor, magnetizing inductor and resonant capacitor components for a Q value that provides voltage gains of at least 1.1 over an entire range of operation.

5. The method of claim 1, further comprising providing a transformer in an output stage to provide either a net voltage boost for step up or a net voltage buck for step down.

6. The method of claim 1, further comprising operating the resonant LLC DC-DC converter either in an LHS operation or an RHS operation for applications that require converters with varying input voltage and load, wherein said operating the resonant LLC DC-DC converter in the LHS operation comprises operating the resonant LLC DC-DC converter at a switching frequency lower than the lower resonant frequency and said operating the resonant LLC DC-DC converter in the RHS operation comprises operating the LLC DC-DC converter at a switching frequency greater than the lower resonant frequency.

7. The method of claim 6, wherein the applications include at least one of solar photovoltaic systems, fuel cells, permanent magnet wind turbines, electric and hybrid vehicles, electric charging stations, aerospace applications, marine applications, micro-grids, and energy storage systems.

8. The method of claim 1, wherein power transfer to an output of the resonant LLC DC-DC converter or a load coupled to the resonant LLC DC-DC converter is controllable by operating the resonant LLC DC-DC converter at a selected one of the first switching frequency and the second switching frequency.

9. The method of claim 1, wherein the resonant LLC DC-DC converter may be operated to allow switching between a unipolar resonant tank excitation and a bipolar resonant tank excitation.

10. The method of claim 9, further comprising switching between a unipolar resonant tank excitation and a bipolar resonant tank excitation to operate the resonant LLC DC-DC converter in a more efficient excitation mode for a given input voltage or current.

11. The method of claim 1, wherein the resonant LLC DC-DC converter is configured for operating in the RHS region of operation and comprises one or more MOSFET switches.

12. The method of claim 1, wherein the resonant LLC DC-DC converter is configured for operating in the LHS region of operation and comprises one or more IGBT switches.

13. The method of claim 1 further comprising balancing voltages on two output capacitors in the resonant LLC DC-DC converter to control power transfer to a bipolar output terminal of the resonant LLC DC-DC converter or a unipolar or bipolar load coupled to the resonant LLC DC-DC converter.

14. The method of claim 1, wherein the output voltage is externally regulated.

15. The method of claim 1, wherein power is transferred from an unregulated input voltage source to an externally regulated voltage source.

16. The method of claim 1, wherein the second voltage gain is approximately equal to the first voltage gain.

17. A resonant LLC DC-DC converter, comprising:
   (a) an input stage comprising either a low voltage full-bridge or a half-bridge DC-AC converter coupled to an input DC voltage and having one or more switches;
   (b) a LLC resonant tank coupled to the input stage having at least a lower resonant frequency and an upper resonant frequency;
   (c) an output rectifier coupled to the LLC resonant tank to provide a DC output at an output terminal; and
wherein the resonant LLC DC-DC converter is configured to operate the LLC resonant tank at a first switching frequency proximate the lower resonant frequency to provide a first power transfer rate at a first voltage gain; and configured to operating the converter at a second switching frequency proximate the lower resonant frequency to transition to a second power transfer rate at a second voltage gain.

18. The resonant LLC DC-DC converter of claim 17, further comprising:
   (a) a transformer coupled to the LLC resonant tank; and
   (b) an output rectifier coupled to the transformer to provide bi-polar (positive, neutral and negative) DC output.

19. The resonant LLC DC-DC converter of claim 17, wherein the second voltage gain is approximately equal to the first voltage gain.

20. A method of operating a resonant DC-DC converter to regulate power transfer, the method comprising:
   providing a resonant DC-DC converter having at least a lower resonant frequency and an upper resonant frequency;
   operating the converter at a first switching frequency proximate the lower resonant frequency to provide a first power transfer rate at a first voltage gain; and
   operating the converter at a second switching frequency proximate the lower resonant frequency to transition to a second power transfer rate at a second voltage gain.

* * * * *